(12) United States Patent
Tsunematsu et al.

(10) Patent No.: US 11,987,520 B2
(45) Date of Patent: *May 21, 2024

(54) SURFACE-TREATED INFRARED ABSORBING FINE PARTICLE DISPERSION LIQUID AND INFRARED ABSORBING TRANSPARENT SUBSTRATE

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 709 days.

This patent is subject to a terminal disclaimer.

(21) Appl. No.: 17/054,789

(22) PCT Filed: Apr. 18, 2019

(86) PCT No.: PCT/JP2019/016586
§ 371 (c)(1),
(2) Date: Nov. 12, 2020

(87) PCT Pub. No.: WO2019/216152
PCT Pub. Date: Nov. 14, 2019

(65) Prior Publication Data
US 2021/0214273 A1    Jul. 15, 2021

(30) Foreign Application Priority Data
May 11, 2018  (JP) .................................. 2018-092604

(51) Int. Cl.
*C01G 41/02* (2006.01)
*C03C 17/00* (2006.01)
(Continued)

(52) U.S. Cl.
CPC .............. *C03C 17/30* (2013.01); *C01G 41/02* (2013.01); *C03C 17/007* (2013.01); *C03C 17/06* (2013.01); *G02B 5/208* (2013.01); *C03C 2217/70* (2013.01)

(58) Field of Classification Search
CPC ....... C03C 17/007; C03C 17/06; C03C 17/30; C01G 41/02; G02B 5/208
See application file for complete search history.

(56) References Cited

U.S. PATENT DOCUMENTS 6,416,890 B1   7/2002  Terneu et al.
11,208,563 B2 * 12/2021  Tsunematsu .............. C09C 1/00
(Continued)

FOREIGN PATENT DOCUMENTS

CN    101050064 A    10/2007
JP    H08-12378 A    1/1996
(Continued)

OTHER PUBLICATIONS

Nov. 17, 2020 International Preliminary Report on Patentability issued in International Patent Application No. PCT/JP2019/016586.
(Continued)

*Primary Examiner* — Jun Li
(74) *Attorney, Agent, or Firm* — Oliff PLC

(57) ABSTRACT

A surface-treated infrared absorbing fine particle dispersion liquid wherein surface-treated infrared absorbing fine particles are dispersed in a liquid medium, and are an infrared absorbing transparent substrate having a coating layer in which the surface-treated infrared absorbing fine particles. This is a surface-treated infrared absorbing fine particle dispersion liquid in which surface treated infrared absorbing fine particles are dispersed in a liquid medium, wherein the surface-treated infrared absorbing fine particles are infrared absorbing fine particles, each surface is coated with a
(Continued)

coating layer containing at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound, and this is an infrared absorbing transparent substrate prepared using the surface-treated infrared absorbing fine particle dispersion liquid.

17 Claims, 1 Drawing Sheet

(51) Int. Cl.
 *C03C 17/06* (2006.01)
 *C03C 17/30* (2006.01)
 *G02B 5/20* (2006.01)

(56) References Cited

U.S. PATENT DOCUMENTS

| | | | |
|---|---|---|---|
| 2006/0178254 | A1 | 8/2006 | Takeda et al. |
| 2006/0257760 | A1* | 11/2006 | Mori ............... G03F 7/2041 430/7 |
| 2007/0292695 | A1 | 12/2007 | Kodaira et al. |
| 2010/0210772 | A1* | 8/2010 | Hiwatashi ............ G02B 5/22 524/406 |
| 2011/0297899 | A1 | 12/2011 | Tofuku |
| 2017/0219750 | A1* | 8/2017 | Nakanishi ............ C08J 7/043 |
| 2017/0261661 | A1* | 9/2017 | Kiyoto ................ G02B 5/12 |
| 2018/0081097 | A1* | 3/2018 | Konuma ............... B32B 27/20 |
| 2019/0085181 | A1 | 3/2019 | Nakayama et al. |
| 2019/0161361 | A1* | 5/2019 | Tsunematsu ............ C09D 5/32 |
| 2021/0047518 | A1 | 2/2021 | Tsunematsu et al. |
| 2022/0081318 | A1* | 3/2022 | Tsunematsu .......... C03C 17/007 |

FOREIGN PATENT DOCUMENTS

| | | |
|---|---|---|
| JP | H08-59300 A | 3/1996 |
| JP | H08-73223 A | 3/1996 |
| JP | H08-283044 A | 10/1996 |
| JP | H09-127559 A | 5/1997 |
| JP | H09-169849 A | 6/1997 |
| JP | 2000-119045 A | 4/2000 |
| JP | 2000-212480 A | 8/2000 |
| JP | 2003-121884 A | 4/2003 |
| JP | 2017-105705 A | 6/2017 |
| KR | 10-2015-0122737 A | 11/2015 |
| TW | 201922951 A | 6/2019 |
| TW | I722334 B | 3/2021 |
| WO | 2005/037932 A1 | 4/2005 |
| WO | 2010/055570 A1 | 5/2010 |
| WO | WO-2010055570 A1 * | 5/2010 ............. B82Y 30/00 |
| WO | 2017/159790 A1 | 9/2017 |
| WO | 2019/093526 A1 | 5/2019 |
| WO | WO-2019093524 A1 * | 5/2019 ............. C01G 41/00 |

OTHER PUBLICATIONS

Jul. 16, 2019 International Search Report issued in International Patent Application No. PCT/JP2019/016586.

\* cited by examiner

[Fig. 1]
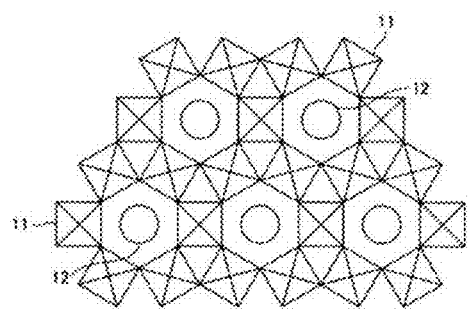
[Fig. 2]
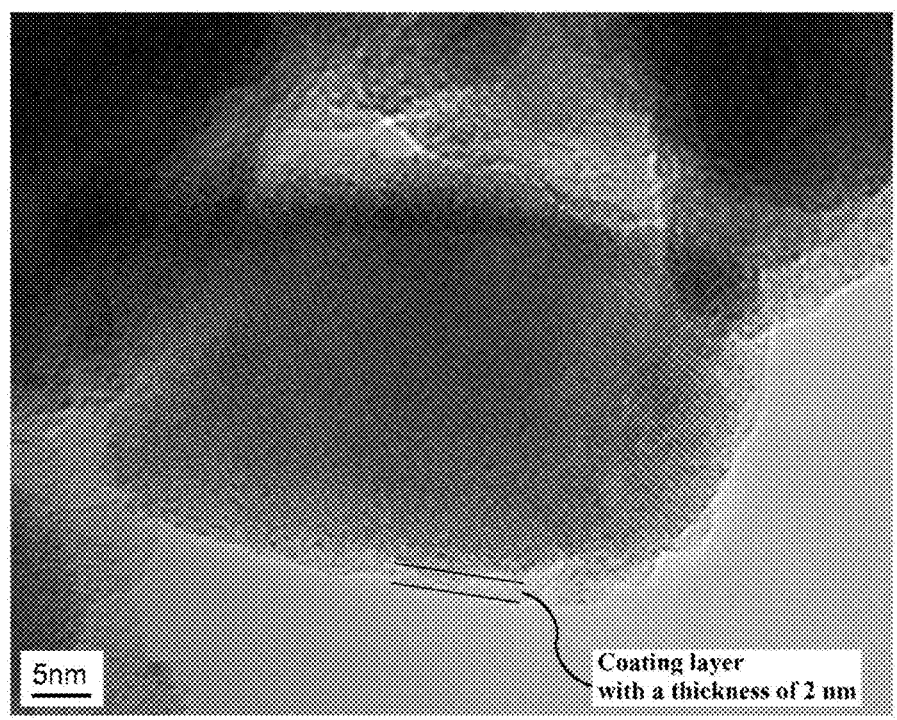

SURFACE-TREATED INFRARED ABSORBING FINE PARTICLE DISPERSION LIQUID AND INFRARED ABSORBING TRANSPARENT SUBSTRATE

TECHNICAL FIELD

The present invention relates to a surface-treated infrared absorbing fine particle dispersion liquid in which surface-treated infrared absorbing fine particles are dispersed in a predetermined liquid medium, the infrared absorbing fine particles being the fine particles whose surface is coated with a predetermined coating layer, and relates to an infrared absorbing transparent substrate having a coating layer in which the surface-treated infrared absorbing fine particles are dispersed.

DESCRIPTION OF RELATED ART

In recent years, a demand for infrared absorbers has increased rapidly, and many proposals have been made for the infrared absorbers.

These proposals will be viewed from a functional perspective. For example, in a field of window materials for various buildings and vehicles, there are infrared absorbers for the purpose of shielding near-infrared light while sufficiently taking in visible light, to suppress a rise in indoor temperature while maintaining brightness, and for the purpose of preventing malfunctions in cordless phones and remote controls of home appliances caused by infrared light radiated forward from PDP (Plasma Display Panel) thereby adversely affecting transmission optical communications, and the like.

Further, these proposals will be viewed from a perspective of a light-shielding member. For example, a light-shielding film containing a black pigment containing inorganic pigments such as carbon black and titanium black, which have absorption properties in the near infrared region from the visible light region, and an organic pigment such as aniline black that has strong absorption properties only in the visible light region, and a half-mirror-type light shielding member on which a metal such as aluminum is deposited, are proposed as a light shielding member used for window materials, etc.

For example, patent document 1 discloses an infrared shielding glass that can be suitably used for parts requiring high visible light transmittance and good infrared shielding performance, by providing a composite tungsten oxide layer containing at least one metal ion selected from a group consisting of Group IIIa, Group IVa, Group Vb, Group VIb and Group VIIb of a periodic table as a first layer on a transparent glass substrate from the substrate side, providing a transparent dielectric layer as a second layer on the first layer, and providing a composite tungsten oxide layer containing at least one metal ion selected from the group consisting of Group IIIa, Group IVa, Group Vb, Group VIb and Group VIIb of the periodic table as a third layer on the second layer, and making a refractive index of the transparent dielectric layer of the second layer lower than that of the composite tungsten oxide layer of the first layer and the third layer.

Further, patent document 2 discloses an infrared shielding glass in which a first dielectric layer is provided as a first layer on a transparent glass substrate from the substrate side, and a tungsten oxide layer is provided as a second layer on the first layer, and a second dielectric layer is provided as a third layer on the second layer in the same manner as in patent document 1.

Further, patent document 3 discloses a heat ray shielding glass in which a composite tungsten oxide layer containing the same metal element as in patent document 1 is provided as a first layer on a transparent substrate from the substrate side, and a transparent dielectric layer is provided as a second layer on the first layer.

Further, patent document 4 discloses a solar control glass sheet with solar shielding properties, which is formed by being coated with a metal oxide layer by a CVD method or a spray method and thereafter being subjected to thermal decomposition at 250° C., the metal oxide layer containing additional elements such as hydrogen, lithium, sodium or potassium, and containing one or more elements selected from tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$).

Further, patent document 5 discloses a solar tunable optical insulation material in which tungsten oxide obtained by hydrolyzing tungstic acid is used, and an organic polymer having a specific structure called polyvinylpyrrolidone is added to the tungsten oxide. When the solar tunable light insulation material is irradiated with sunlight, ultraviolet rays in the light is absorbed by the tungsten oxide to generate excited electrons and holes, an appearance amount of pentavalent tungsten is significantly increased due to a small amount of ultraviolet rays, and a coloring reaction is accelerated, accordingly, a coloring concentration is increased. On the other hand, by shielding the light, the pentavalent tungsten is very quickly oxidized to hexavalent and a decoloring reaction is accelerated. It is proposed that by using the coloring/decoloring properties, the coloring and decoloring reactions to sunlight are fast, an absorption peak appears at a wavelength of 1250 nm in the near infrared region at the time of coloring, and a solar tunable optical insulation material capable of shielding the near-infrared light of sunlight can be obtained.

On the other hand, the present inventors disclose in patent document 6 that tungsten oxide fine powder including tungsten trioxide or its hydrate or a mixture of both is obtained by dissolving tungsten hexachloride in alcohol and evaporating a medium as it is, or evaporating the medium after heating to reflux and applying heat treatment thereafter at 100° C. to 500° C., and disclose that an electrochromic device can be obtained using the tungsten oxide fine particles, and when a multi-layered laminate is formed and protons are introduced into the layer, the optical properties of the layer can be changed.

Further, patent document 7 discloses a method for producing various tungsten bronze represented by general formula $M_xWO_3$ (M, metal element such as alkali, alkaline earth, rare earth, satisfying $0<x<1$), by using a meta-type ammonium tungstate and various water-soluble metal salts as raw materials, heating a dried product of a mixed aqueous solution at a heating temperature of about 300 to 700° C., and supplying hydrogen gas to which inert gas (addition amount: about 50 vol % or more) or steam (addition amount: about 15 vol % or less) is added for this heating, and discloses a method for producing various tungsten bronze coated composites by performing the same operation on a supporting body, so as to be used as an electrode catalyst material for fuel cells, etc.

Further, the present inventors disclose in patent document 8 an infrared shielding material fine particle dispersion body in which infrared shielding material fine particles are dispersed in a medium, optical properties, conductivity and a method for producing the infrared shielding material fine particle dispersion body. The infrared shielding material fine particles are composite tungsten oxide fine particles represented by a general formula WyOz (where W is tungsten, O is oxygen, satisfying $2.2 \leq z/y \leq 2.999$), and/or composite tungsten oxide fine particles represented by a general formula MxWyOz (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, 1, W is tungsten, O is oxygen, satisfying $0.001 \leq x/y \leq 1$, $2.2 \leq z/y \leq 3.0$), and a particle size of the infrared shielding material fine particles is 1 nm or more and 800 nm or less.

PRIOR ART DOCUMENT

Patent Document

[Patent Document 1] JP-A-8-59300
[Patent Document 2] JP-A-8-12378
[Patent Document 3] JP-A-8-283044
[Patent Document 4] JP-A-2000-119045
[Patent Document 5] JP-A-9-127559
[Patent Document 6] JP-A-2003-121884
[Patent Document 7] JP-A-8-73223
[Patent Document 8] International Publication No. 2005/37932
[Patent Document 9] International Publication No. 2010/55570

SUMMARY OF THE INVENTION

Problem to be Solved by the Invention

According to studies by the present inventors, it is found that in an optical member (transparent substrate, film, resin sheet, etc.) containing the tungsten oxide fine particles, and/or composite tungsten oxide fine particles, steam in the air and water gradually penetrate into a coating layer or a solid resin contained in the optical member, depending on usage conditions and methods. It is also found that when steam and water penetrate into the coating layer and the solid resin, there is a problem that a surface of the tungsten oxide fine particles and/or the composite tungsten oxide fine particles is decomposed, then, a transmittance of light having a wavelength of 200 to 2600 nm increases with time, and an infrared absorption performance of the optical member gradually decreases.

In the present invention, the "coating layer" is a medium layer that is solid at room temperature and is formed on a substrate with a predetermined film thickness.

Also, in the present invention, the "solid resin" is a polymer medium that is solid at room temperature, and includes polymer medium other than those three-dimensionally crosslinked. Further, in the present invention, the polymer medium that is solid at room temperature may be referred to as "resin".

Further, according to the study by the present inventors, it is found that also in the tungsten oxide fine particles and the composite tungsten oxide fine particles dispersed in the medium disclosed in Patent Document 8, steam or water in the air decomposes and deteriorates the surface of the particles. It is also found that particularly, the higher the surface activity of the tungsten oxide particles or the composite tungsten oxide particles, the greater the loss ratio of the infrared absorption effect due to the decomposition and deterioration.

Under the above-described circumstance, the present inventors disclose in patent document 9 infrared shielding fine particles with excellent water resistance and excellent infrared shielding properties, which are tungsten oxide particles represented by a general formula WyOz and/or composite tungsten oxide fine particles represented by a general formula MxWyOz, wherein an average primary particle size of the fine particles is 1 nm or more and 800 nm or less, and a surface of the fine particles is coated with a tetrafunctional silane compound or a partial hydrolysis product thereof, and/or an organometallic compound, and disclose a method for producing them.

However, infrared absorbing materials are basically used outdoors because of their properties, and often require high weather resistance. As an example of outdoor use, there is an infrared absorbing transparent substrate having an infrared absorbing material-containing coating layer on at least one surface of the transparent substrate. Then, as a demand in the market has been increasing year by year, the infrared shielding fine particles and the infrared absorbing transparent substrate containing the infrared shielding fine particles disclosed in Patent Document 9 have been required to be further improved in resistance to water, moisture, and heat.

Under the above-described circumstance, the present invention is provided, and an object of the present invention is to provide surface-treated infrared absorbing fine particle dispersion liquid in which surface-treated infrared absorbing fine particles with excellent moisture/heat resistance and excellent infrared-absorbing properties, are dispersed in a predetermined liquid medium, and an infrared absorbing transparent substrate having a coating layer in which the surface-treated infrared absorbing fine particles are dispersed.

Means for Solving the Problem

In order to solve the above-described problem, the present inventors study on the following configuration: the tungsten oxide fine particles or/and composite tungsten oxide fine particles having excellent optical properties are selected as infrared absorbing fine particles, to improve the moisture/heat resistance and chemical stability of the infrared absorbing fine particles. As a result, it is found that it is important to coat a surface of each infrared absorbing fine particle, using a compound that has excellent affinity with the surface of the infrared absorbing fine particles, and is uniformly adsorbed on the surface of the individual infrared absorbing fine particles to form a strong coating layer on the surfaces of the fine particles.

After further study by the present inventors, a metal chelate compound and a metal cyclic oligomer compound are found to be a compound that has excellent affinity with a surface of the infrared absorbing fine particles to form a strong coating layer on the surfaces of the fine particles as described above. As a result of further study, hydrolysis products of these metal chelate compound and metal cyclic oligomer compound formed when these compounds are hydrolyzed, or polymer of hydrolysis product is uniformly adsorbed on the surface of the individual infrared absorbing fine particles, to form a strong coating layer.

Namely, the present inventors found the infrared absorbing fine particles (it may be referred to as "surface-treated infrared absorbing fine particles" in the present invention) which are the tungsten oxide fine particles and/or the composite tungsten oxide fine particles with their surfaces coated with a coating layer containing at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound. Then, it is found that the surface-treated infrared absorbing fine particles have excellent moisture/heat resistance.

The present inventors also found the infrared absorbing transparent substrate with a coating layer in which the surface-treated infrared absorbing fine particles are dispersed. It is also found that the surface-treated infrared absorbing fine particle dispersion liquid in which the surface-treated infrared absorbing fine particles are dispersed in a predetermined liquid medium is suitable as a coating liquid for forming the coating layer. Thus, the present invention is completed.

Namely, in order to solve the above-described problem, a first invention provides a surface-treated infrared absorbing fine particle dispersion liquid in which surface treated infrared absorbing fine particles are dispersed in a liquid medium, wherein the surface-treated infrared absorbing fine particles are infrared absorbing fine particles, each surface of which is coated with a coating layer containing at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound.

A second invention provides the surface-treated infrared absorbing fine particle dispersion liquid according to the first invention, wherein the metal chelate compound or the metal cyclic oligomer compound contains at least one metal element selected from Al, Zr, Ti, Si, Zn.

A third invention provides the surface-treated infrared absorbing fine particle dispersion liquid according to the first or second invention, wherein the metal chelate compound or the metal cyclic oligomer compound has at least one selected from an ether bond, an ester bond, an alkoxy group, and an acetyl group.

A fourth invention provides the surface-treated infrared absorbing fine particle dispersion liquid according to any one of the first to third inventions, wherein the infrared absorbing fine particles are the infrared absorbing fine particles represented by a general formula WyOz (where W is tungsten, O is oxygen, satisfying $2.2 \le z/y \le 2.999$), and/or a general formula MxWyOz (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, and W is tungsten, O is oxygen, satisfying $0.001 \le x/y \le 1$, $2.0 \le z/y \le 3.0$).

A fifth invention provides the surface-treated infrared absorbing fine particle dispersion liquid according to the fourth invention, wherein the M is one or more elements selected from Cs, K, Rb, Tl, In and Ba.

A sixth invention provides the surface-treated infrared absorbing fine particle dispersion liquid according to any one of the first to fifth inventions, wherein the infrared absorbing fine particles are tungsten oxide fine particles and/or composite tungsten oxide fine particles, each having a hexagonal crystal structure.

A seventh invention provides the surface-treated infrared absorbing fine particle dispersion liquid according to any one of the first to sixth inventions, wherein the surface-treated infrared absorbing fine particle dispersion liquid further contains a glass coating agent.

A eighth invention provides the surface-treated infrared absorbing fine particle dispersion liquid according to the seventh invention, wherein the liquid medium is at least one selected from aromatic hydrocarbons, ketones, ethers, alcohols, and water, and
the glass coating agent is at least one selected from silane coupling agents and silane-based alkoxides.

A nineth invention provides the surface-treated infrared absorbing fine particle dispersion liquid according to the seventh invention, wherein the liquid medium is at least one selected from aromatic hydrocarbon, ketone, ether, and
the glass coating agent is at least one selected from polysilazane and polyorganosilane.

The tenth invention provides an infrared absorbing transparent substrate having a coating layer on at least one surface of one or more transparent substrates,
wherein the coating layer contains surface-treated infrared absorbing fine particles, and
the surface-treated infrared absorbing fine particles are infrared absorbing fine particles, each surface of which is coated with a coating layer containing at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound.

The eleventh invention provides the infrared absorbing transparent substrate according to the tenth invention, wherein the metal chelate compound or the metal cyclic oligomer compound contains at least one metal element selected from Al, Zr, Ti, Si, Zn.

The twelfth invention provides the infrared absorbing transparent substrate according to the tenth or eleventh invention, wherein the metal chelate compound or the metal cyclic oligomer compound has at least one type selected from an ether bond, an ester bond, an alkoxy group, and an acetyl group.

The thirteenth invention provides the infrared absorbing transparent substrate according to any one of the tenth to twelfth inventions, wherein the infrared absorbing fine particles are the infrared absorbing fine particles represented by a general formula WyOz (where W is tungsten, O is oxygen, satisfying $2.2 \le z/y \le 2.999$), and/or a general formula MxWyOz (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, I, Yb, W is tungsten, O is oxygen, satisfying $0.001 \le x/y \le 1$, $2.0 \le z/y \le 3.0$).

The fourteenth invention provides the infrared absorbing transparent substrate according to the thirteenth invention, wherein the M is one or more element selected from Cs, K, Rb, Tl, In and Ba.

The fifteenth invention provides the infrared absorbing transparent substrate according to any one of the tenth to fourteenth inventions, wherein the infrared absorbing fine particles are tungsten oxide fine particles and/or composite tungsten oxide fine particles, each having a hexagonal crystal structure.

The sixteenth invention provides the infrared absorbing transparent substrate according to any one of the tenth to fifteenth inventions, wherein the coating layer further contains a glass coating agent.

The seventeenth invention provides the infrared absorbing transparent substrate according to the sixteenth invention, wherein the glass coating agent is at least one selected from a silane coupling agent, silane-based alkoxide, polysilazane, and polyorganosilane.

The eighteenth invention provides the infrared absorbing transparent substrate according to any one of the tenth to seventeenth inventions, wherein the transparent substrate is at least one selected from a transparent glass substrate and a transparent resin substrate.

Advantage of the Invention

Surface-treated infrared absorbing fine particles and surface-treated infrared absorbing fine particles powder containing them according to the present invention, have excellent infrared absorption properties as well as excellent moisture/heat resistance. As a result, by using the surface-treated infrared absorbing fine particle dispersion liquid containing the surface-treated infrared absorbing fine particles as a coating liquid, and by providing a coating layer on a given substrate, an infrared absorbing transparent substrate having excellent infrared absorption properties and also excellent moisture and heat resistance, can be obtained.

BRIEF DESCRIPTION OF THE DRAWINGS

FIG. 1 is a schematic plan view of a crystal structure of a composite tungsten oxide having a hexagonal crystal structure.

FIG. 2 is a transmission electron micrograph of surface-treated infrared absorbing fine particles according to Example 1 at a magnification of 300,000.

DETAILED DESCRIPTION OF THE INVENTION

An infrared absorbing transparent substrate having a coating layer in which surface-treated infrared absorbing fine particles are dispersed, and a surface-treated infrared absorbing fine particle dispersion liquid which is a coating liquid for suitably forming the coating layer according to the present invention, will be described in an order of [1] Infrared absorbing fine particles, [2] A surface treating agent used for surface coating of infrared absorbing fine particles, [3] Method for coating surfaces of infrared absorbing fine particles, [4] Method for producing surface-treated infrared absorbing fine particle powder, [5] Heat treatment of surface-treated infrared absorbing fine particle powder, [6] Surface-treated infrared absorbing fine particle dispersion liquid, and [7] Infrared absorbing transparent substrate.

[1] Infrared Absorbing Fine Particles

Infrared absorbing fine particles used in the infrared absorbing transparent substrate, surface-treated infrared absorbing fine particle dispersion liquid and surface-treated infrared absorbing fine particle powder according to the present invention are the infrareds absorbing fine particles represented by a general formula $W_yO_z$ (where W is tungsten, O is oxygen, satisfying $2.2 \leq z/y \leq 2.999$), and/or a general formula $M_xW_yO_z$ (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, and W is tungsten, O is oxygen, satisfying $0.001 \leq x/y \leq 1$, $2.0 \leq z/y \leq 3.0$).

Generally, it is known that a material containing free electrons exhibits a reflection-absorption response to an electromagnetic wave around a solar ray region having a wavelength of 200 nm to 2600 nm due to plasma vibration. It is known that when powdery particles of such a material are made into particles smaller than a wavelength of light, geometric scattering in a visible light region (wavelength 380 nm to 780 nm) is reduced, and transparency in the visible light region is obtained.

Note that in the present invention, the term "transparency" is used to mean "there is little scattering and high transmittance with respect to light in the visible light region".

On the other hand, there are no effective free electrons in tungsten oxide ($WO_3$), and therefore $WO_3$ has little absorption and reflection properties in the infrared region, and is not effective as the material of the infrared absorption fine particles. However, it is known that with a configuration of $WO_3$ having oxygen deficiency or composite tungsten oxide added with a positive element such as Na to $WO_3$, free electrons are generated in the tungsten oxide and the composite tungsten oxide, and free electron-derived absorption properties appear in an infrared region. Then, analysis of a single crystal or the like of a material having these free electrons suggests a response of the free electrons to light in the infrared region.

The present inventors found that there is a particularly effective range as infrared absorbing fine particles in a specific portion of a composition range of the tungsten and oxygen, and conceived of tungsten oxide fine particles, composite tungsten oxide fine particles that are transparent in the visible light region and having absorption in the infrared region.

Here, the tungsten oxide fine particles and/or the composite tungsten oxide fine particles which are infrared absorbing fine particles according to the present invention will be described in an order of (1) Tungsten oxide fine particles, (2) Composite tungsten oxide fine particles, (3) Infrared Absorbing Fine Particles.

(1) Tungsten Oxide Fine Particles

The tungsten oxide fine particles according to the present invention are fine particles of tungsten oxide represented by a general formula $W_yO_z$ (W is tungsten, O is oxygen, and satisfying $2.2 \leq z/y \leq 2.999$).

In the tungsten oxide represented by the general formula $W_yO_z$, it is known that by decreasing the composition ratio of oxygen to tungsten to less than 3 in the composition range of the tungsten and oxygen, free electrons are generated in the tungsten oxide.

Further, when the infrared absorbing fine particles are described as $W_yO_z$, it is preferably $2.2 \leq z/y \leq 2.999$. When the value of z/y is 2.2 or more, an appearance of a $WO_2$ crystal phase other than an intended one in the tungsten oxide can be avoided, and it is possible to obtain chemical stability as a material, and therefore the tungsten oxide becomes an effective infrared absorbing fine particles. On the other hand, when the value of z/y is 2.999 or less, a required amount of free electrons is generated, resulting in efficient infrared absorbing fine particles.

(2) Composite Tungsten Oxide Fine Particles

The composite tungsten oxide is obtained by adding an element M described later to the composite tungsten oxide ($WO_3$) described above. Then, for $WO_3$, by performing both control of an oxygen amount and addition of the element M that generates free electrons, more efficient infrared absorbing fine particles can be obtained. By adopting the above configuration, free electrons are generated in the composite tungsten oxide, strong absorption properties derived from the free electrons are exhibited particularly in the near-infrared region, and such composite tungsten oxide particles are effective as near-infrared absorbing fine particles having a wavelength of around 1000 nm.

Infrared absorbing fine particles obtained by performing both the control of the oxygen amount and the addition of the element M that generates free electrons are represented by a general formula MxWyOz (where M is element M described later, W is tungsten, and O is oxygen) in which a relation of x, y, z is preferably in a range of $0.001 \leq x/y \leq 1$, $2.0 \leq z/y \leq 3$.

Here, the element M in the composite tungsten oxide is preferably one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb.

Further, the element M is preferably one or more kinds selected from alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re from a viewpoint of stability in the MxWyOz to which the element M is added. In addition, the element M more preferably belongs to an alkaline metal, an alkaline earth metal element, a transition metal element, a 4B group element, or a 5B group element, from a viewpoint of improving optical properties and weather resistance as infrared absorbing fine particles.

Values of x/y indicating an addition amount of the element M will be described. When the value of x/y is larger than 0.001, a sufficient amount of free electrons are generated in the composite tungsten oxide, and a desired infrared absorption effect can be obtained. Therefore, as the addition amount of the element M increases, the supply amount of the free electrons increases and the infrared absorption efficiency also increases, but when the value of x/y is about 1, the effect is saturated. Further, when the value of x/y is smaller than 1, it is preferable because it is possible to avoid the formation of an impurity phase in the infrared absorbing fine particles.

Further, values of z/y indicating the control of the oxygen amount will be described. In the composite tungsten oxide represented by MxWyOz, the same mechanism as the above-described tungsten oxide represented by WyOz works, and in addition, when z/y=3.0 or $2.0 \leq z/y \leq 2.2$, there is a supply of free electrons depending on the amount of the element M described above. Therefore, the values of z/y is preferably $2.0 \leq z/y \leq 3.0$, more preferably $2.2 \leq z/y \leq 3.0$, and further more preferably $2.45 \leq z/y \leq 3.0$.

Further, when the composite tungsten oxide fine particles have a hexagonal crystal structure, the transmission of the fine particles in the visible light region is improved, and the absorption of the fine particles in the infrared region is improved. This will be described with reference to FIG. 1 which is a schematic plan view of the hexagonal crystal structure.

In FIG. 1, a hexagonal void is formed by assembling six hexahedrons formed by units of $WO_6$ indicated by reference numeral 11. Then, the element M indicated by reference numeral 12 is arranged in the void to constitute one unit, and a large number of these units gather to form a hexagonal crystal structure.

In order to obtain the effect of improving light transmission in the visible light region and improving light absorption in the near-infrared region, a unit structure described using FIG. 1 may be included in the composite tungsten oxide fine particles, and the composite tungsten oxide fine particles may be crystalline or amorphous.

When the composite tungsten oxide fine particles having a hexagonal crystal structure have a uniform crystal structure, the addition amount of the element M is preferably 0.2 or more and 0.5 or less, and more preferably 0.33 in terms of x/y. It is considered that when the value of x/y is 0.33, the above-described element M is arranged in all the hexagonal voids.

When the cation of the element M is present in the hexagonal voids, the light transmission in the visible light region is improved, and the light absorption in the infrared region is improved. Here, generally, when an element M having a large ionic radius is added, the hexagonal crystal is easily formed. Specifically, when one or more of Cs, K, Rb, Tl, In, Ba, Li, Ca, Sr, Fe, Sn, more preferably one or more of Cs, K, Rb, Tl, In, Ba are added, a hexagonal crystal is easily formed. Typical examples include $Cs_{0.33}WOz$, $Cs_{0.03}Rb_{0.30}WOz$, $Rb_{0.33}WOz$, $K_{0.33}WOz$, $Ba_{0.33}WOz$ ($2.0 \leq z \leq 3.0$) and the like. Of course, other elements may be used as long as the above-described element M is present in the hexagonal voids formed by $WO_6$ units, and is not limited to the above-described elements.

Further, tetragonal and cubic composite tungsten oxides are also effective as infrared absorbing fine particles, other than hexagonal. An absorption position in the infrared region tends to change depending on the crystal structure, and the absorption position tends to shift to a longer wavelength side in an order of cubic crystal <tetragonal crystal <hexagonal crystal. Further, accompanying such a tendency, hexagonal crystal, tetragonal crystal, and cubic crystal in this order, have low absorption in the visible light region. Accordingly, it is preferable to use a hexagonal composite tungsten oxide for applications that transmit more visible light and shield more infrared light. However, the present invention is not limited thereto and the tendency of the optical properties described here is only a rough tendency, and is varied depending on the kind of the added element, an addition amount and an oxygen amount.

(3) Infrared Absorbing Fine Particles

The infrared absorbing fine particles according to the present invention contain tungsten oxide fine particles and/or composite tungsten oxide fine particles, and the infrared absorbing fine particles according to the present invention largely absorb light in the near-infrared region, particularly near the wavelength of 1000 nm, and therefore a transmission color tone thereof is often from blue to green.

The infrared absorbing fine particles according to the present invention preferably have a particle size of 1 nm or more and 800 nm or less, but more preferably 100 nm or less. From a viewpoint of exhibiting more excellent infrared absorption properties, the particle size of the fine particles is preferably 10 nm or more and 100 nm or less, more preferably 10 nm or more and 80 nm or less, and most preferably 10 nm or more and 60 nm or less. It was found that when the particle size is in a range of 10 nm or more and 60 nm or less, the best infrared absorption properties are exhibited.

Here, the particle size is an average value of the diameters of the individual infrared absorbing fine particles that are not aggregated, and is an average particle size of the infrared absorbing fine particles contained in the infrared absorbing transparent substrate, the surface-treated infrared absorbing fine particle dispersion liquid, and the surface-treated infrared absorbing fine particle powder, which will be described later. The particle size is calculated from an electron microscope image of the infrared absorbing fine particles.

On the other hand, the dispersed particle size of the infrared absorbing fine particles according to the present invention can be selected according to the purpose of use. The dispersed particle size is a concept that includes the particle size of the aggregate, unlike the above-described particle size.

When the infrared absorbing fine particles of the present invention is used in applications where transparency is desired to be maintained, the particles preferably have a particle size of 800 nm or less. This is because particles smaller than 800 nm do not completely shield light due to scattering, and maintain visibility in the visible light region, and at the same time, maintain transparency efficiently. Particularly, when importance is placed on transparency in the visible light region, it is preferable to further consider scattering by particles.

When importance is placed on a reduction of scattering by the infrared absorbing fine particles, the dispersed particle size is preferably 200 nm or less, and more preferably 100 nm or less. This is because when the dispersed particle size of the particles is small, scattering of light in the visible light region having a wavelength of 400 nm to 780 nm due to geometric scattering or Mie scattering is reduced, and as a result, it is possible to avoid a situation such that an infrared absorbing layer becomes like frosted glass, and clear transparency cannot be obtained. Namely, this is because when the dispersed particle size is 200 nm or less, the geometric scattering or Mie scattering is reduced, and a Rayleigh scattering region is formed. In the Rayleigh scattering region, the scattered light decreases in proportion to a sixth power of the particle size, and therefore scattering is reduced and transparency is improved as the dispersed particle size decreases.

Further, when the dispersed particle size becomes 100 nm or less, scattered light is very small, which is preferable. From a viewpoint of avoiding light scattering, it is preferable that the dispersed particle size is small, and when the dispersed particle size is 1 nm or more, industrial production is easy.

By setting the dispersed particle size to 800 nm or less, the haze value of the infrared absorbing fine particle dispersion body in which the infrared absorbing fine particles according to the present invention are dispersed in a medium, can be 30% or less when visible light transmittance is 85% or less. When the haze value is larger than 30%, the infrared absorbing fine particle dispersion body becomes like a frosted glass, and clear transparency cannot be obtained.

Note that the dispersed particle size of the infrared absorbing fine particles can be measured using ELS-8000 manufactured by Otsuka Electronics Co., Ltd. based on a dynamic light scattering method.

Further, in the tungsten oxide fine particles and the composite tungsten oxide fine particles, a so-called "Magneli phase" having a composition ratio represented by $2.45 \leq z/y \leq 2.999$ is chemically stable, and an absorption property in the near-infrared region is good. Therefore, the tungsten oxide fine particles and the composite tungsten oxide fine particles are preferable as near-ultrafine absorbing particles.

Further, from a viewpoint of exhibiting excellent near-infrared absorption properties, the crystallite size of the infrared absorbing fine particles is preferably 1 nm or more and 200 nm or less, more preferably 1 nm or more and 100 nm or less, and further preferably 10 nm or more and 70 nm or less.

For the measurement of the crystallite size, measurement of an X-ray diffraction pattern by a powder X-ray diffraction method ($\theta$-$2\theta$ method) and analysis by a Rietveld method are used. The measurement of the X-ray diffraction pattern can be performed using, for example, a powder X-ray diffractometer "X'Pert-PRO/MPD" manufactured by SPECTALY CORPORATION.

[2] Surface Treating Agent Used for Surface Coating of Infrared Absorbing Fine Particles A surface treating agent used for a surface coating of the infrared absorbing fine particles according to the present invention is at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound.

Then, the metal chelate compound and the metal cyclic oligomer compound are preferably metal alkoxide, metal acetylacetonate, and metal carboxylate, and from this viewpoint, preferably has at least one selected from an ether bond, an ester bond, an alkoxy group, and an acetyl group.

The surface treating agent of the infrared absorbing fine particles according to the present invention will be described hereafter in an order of (1) Metal chelate compound, (2) Metal cyclic oligomer compound, (3) Hydrolysis product and polymer of them, and (4) addition amount of surface treating agent.

(1) Metal Chelate Compound

The metal chelate compound used in the present invention is preferably one or more selected from Al-based, Zr-based, Ti-based, Si-based, and Zn-based chelate compounds containing an alkoxy group.

The aluminum chelate compound includes for example: aluminum alcoholates such as aluminum ethylate, aluminum isopropylate, aluminum sec-butylate, mono-sec-butoxyaluminum diisopropylate or these polymers, ethyl acetoacetate aluminum diisopropylate, aluminum tris (ethyl acetoacetate), octyl acetoacetate aluminum diisopropylate, stearyl acetoaluminum diisopropylate, aluminum monoacetylacetonate bis (ethylacetoacetate), aluminum tris (acetylacetonate), etc.

These compounds are aluminum chelate compounds containing alkoxy groups obtained by dissolving aluminum alcoholate in aprotic solvent, petroleum solvent, hydrocarbon solvent, ester solvent, ketone solvent, ether solvent, amide solvent, etc., and adding pi-diketone, $\beta$-ketoester, monohydric or polyhydric alcohol, fatty acid, etc. to the above solution, and heating the mixture under reflux to cause a ligand displacement reaction.

The zirconia chelate compound includes for example: zirconium alcoholate such as zirconium ethylate, zirconium butyrate or these polymer, zirconium tributoxystearate, zirconium tetraacetylacetonate, zirconium tributoxyacetylacetonate, zirconium dibutoxybis (acetylacetonate), zirconium tributoxyethyl acetoacetate, zirconium butoxyacetylacetonate bis (ethylacetoacetate), etc.

The titanium chelate compound includes: titanium alcoholates such as methyl titanate, ethyl titanate, isopropyl titanate, butyl titanate, 2-ethylhexyl titanate and these polymers, titanium acetylacetonate, titanium tetraacetylacetonate, titanium octylene glycolate, titanium ethyl acetoacetate, titanium lactate, titanium triethanol aminate, etc.

The silicon chelate compound includes for example: tetrafunctional silane compounds represented by a general formula: Si $(OR)_4$ (where R is the same or different monovalent hydrocarbon group having 1 to 6 carbon atoms) or a hydrolysis product thereof. Specific examples of the tetrafunctional silane compounds include: tetramethoxysilane, tetraethoxysilane, tetrapropoxysilane, tetrabutoxysilane, etc., and further includes: a silane monomer (or oligomer) in which part or all of the alkoxy groups of these alkoxysilane monomers are hydrolyzed to form a silanol group (Si—OH), and polymers self-condensed through hydrolysis reaction. Further, the hydrolysis product of a tetrafunctional silane compound (it means an entire hydrolysis product of the tetrafunctional silane compound) includes for example: a silane monomer in which a part or all of an alkoxy group is hydrolyzed to a silanol (Si—OH) group, oligomers of 4 to 5 mer, and polymers (silicone resin) having a weight average molecular weight (Mw) of about 800 to 8000. Note that in the course of the hydrolysis reaction, not all of the alkoxysilyl groups (SiC—OR) in the alkoxysilane monomer are hydrolyzed to silanol group (Si—OH).

The zinc-based chelate compound preferably includes for example: organic zinc carboxylate such as zinc octylate, zinc laurate, zinc stearate, zinc acetylacetone chelate, benzoylacetone zinc chelate, dibenzoylmethane zinc chelate, ethyl zinc acetoacetate chelate, etc.

(2) Metallic Cyclic Oligomer Compound

The metallic cyclic oligomer compound according to the present invention preferably includes for example: at least one selected from Al-based, Zr-based, Ti-based, Si-based, and Zn-based cyclic oligomer cyclic compounds, and includes for example: cyclic aluminum oxide octylate, cyclic aluminum oxide isopropylate, cyclic aluminum oxide stelate and the like.

(3) Hydrolysis Products and Polymers of Metal Chelate Compounds and Metal Cyclic Oligomer Compounds In the present invention, the surface of the infrared absorbing fine particles according to the present invention is coated with hydrolysis product in which all of the alkoxy groups, ether bonds, and ester bonds in the above-described metal chelate compound and metal cyclic oligomer compound are hydrolyzed to form hydroxyl groups and carboxyl groups, partially hydrolyzed partial hydrolysis product, or/and polymer that self-condensed through the hydrolysis reaction, thereby forming a coating layer, to obtain the surface-treated infrared absorbing fine particles according to the present invention.

Namely, the hydrolysis product in the present invention is a concept including a partial hydrolysis product.

In the present invention, in order to impart moisture/heat resistance to the infrared absorbing fine particles, a coating layer is formed on each surface of the fine particles using at least one selected from hydrolysis products of metal chelate compounds, polymers of the hydrolysis products of metal chelate compounds, and hydrolysis products of metallic cyclic oligomer compounds, polymers of the hydrolysis products of the metallic cyclic oligomer compounds, and such a coating layer is sometimes referred to as a coating layer.

However, for example, in a reaction system in which an organic solvent such as alcohol is interposed, not all of the alkoxy groups, ether bonds and ester bonds of the metal chelate compound or metal cyclic oligomer compound serving as a starting material are hydrolyzed depending on the kind and concentration of the organic solvent, generally, even if necessary and sufficient water exists in the system due to stoichiometric composition. Accordingly, some of them may become amorphous with carbon C incorporated in the molecule of the hydrolysis product even after hydrolysis, depending on the conditions of the surface coating method described below. As a result, the coating layer may contain an undecomposed metal chelate compound and/or metal cyclic oligomer compound.

When the coating layer contains an undecomposed metal chelate compound or/and a metal cyclic oligomer compound, there is a risk of causing a rapidly proceeding a hydrolysis reaction and a dehydration condensation reaction of silane coupling agent, silane alkoxide, polysilazane in a glass coating agent used to prepare an infrared absorbing transparent substrate in a subsequent process. Further, as a result of the rapid progress of the above reactions, there is a possibility that polymers of the silane coupling agent, silane alkoxides and polysilazane act as cross-linking agents, thereby causing an aggregation of the surface-treated infrared-absorbing fine particles in the surface-treated infrared-absorbing fine particle dispersion liquid, and it becomes impossible to obtain a desired infrared absorbing transparent substrate having both visible light transparency and infrared absorbing properties.

To avoid such a situation, when the coating layer contains an undecomposed metal chelate compound or/and metal cyclic oligomer compound, it is preferable that a decomposition of these compounds is promoted by a heat treatment described later, and the reaction is carried out until a polymer of the hydrolysis product having low reactivity is obtained.

That is, it is preferable that the coating layer that covers the surface of each infrared absorbing fine particle according to the present invention, comprises a polymer which is a self-condensed hydrolysis product through a hydrolysis reaction. In the hydrolysis product, partial or all of the alkoxy groups, ether bonds, and ester bonds in the above-described metal chelate compounds and metal cyclic oligomer compounds are hydrolyzed to become hydroxyl groups and carboxyl groups.

(4) Addition Amount of Surface Treating Agent

The above-described addition amount of the metal chelate compound or metal cyclic oligomer compound is preferably 0.05 parts by weight or more and 1000 parts by weight or less in terms of metal elements, and more preferably in a range of 5 parts by weight or more and 500 parts by weight or less, and even more preferably 50 parts by weight or more and 250 parts by weight or less, with respect to 100 parts by weight of the infrared absorbing fine particles.

This is because when the addition amount of the metal chelate compound or the metal cyclic oligomer compound is 0.05 parts by weight or more, hydrolysis products of those compounds and polymers of the hydrolysis products exert the effect of coating the surface of the infrared absorbing fine particles, and the effect of improving moisture/heat resistance can be obtained.

Further, when the addition amount of the metal chelate compound or the metal cyclic oligomer compound is 1000 parts by weight or less, excessive adsorption on the infrared absorbing fine particles can be avoided. Further, an improvement of the moisture/heat resistance by the surface coating is not saturated, and an improvement of the coating effect can be expected.

Further, this is because when the addition amount of the metal chelate compound or the metal cyclic oligomer compound is 1,000 parts by mass or less, excessive adsorption on the infrared absorbing fine particles can be avoided, and it is possible to avoid a situation that the fine particles are easily granulated through the hydrolysis products of the metal chelate compound or the metal cyclic oligomer compound or the polymer of the hydrolysis product during the removal of the medium. Good transparency can be ensured by avoiding granulation of the undesired fine particles.

In addition, it is also possible to avoid an increase in a production cost due to an increase in the addition amount and the treatment time due to the excess of the metal chelate compound or the metal cyclic oligomer compound. Therefore, from an industrial point of view, the addition amount of the metal chelate compound or metal cyclic oligomer compound is preferably 1000 parts by weight or less.

Further, a layer thickness of the coating layer of the surface-treated infrared absorbing fine particles according to the present invention is preferably 0.5 nm or more. The reason is as follows: it can be considered that when the layer thickness of the coating layer is 0.5 nm or more, the surface-treated infrared absorbing fine particles exhibit sufficient moisture/heat resistance and chemical stability. On the other hand, it is considered that the layer thickness of the coating layer is preferably 100 nm or less from a viewpoint that the surface-treated infrared absorbing fine particles ensure predetermined optical properties.

As described above, the thickness of the coating layer is more preferably 0.5 nm or more and 20 nm or less, and further preferably 1 nm or more and 10 nm or less.

The thickness of the coating layer can be measured from a transmission electron microscope image of the surface-treated infrared absorbing fine particles. For example, in a transmission electron microscope image shown in FIG. 2, which is 300,000 times larger than the surface-treated infrared absorbing fine particles according to Example 1, a portion sandwiched between two parallel solid lines where the lattice fringes (arrangement of atoms in the crystal) of the infrared absorbing fine particles are not observed, corresponds to the coating layer.

[3] Method for Coating Surface of the Infrared Absorbing Fine Particles

To produce surface-treated infrared absorbing fine particles by coating each surface of the infrared absorbing fine particles according to the present invention, first, the infrared absorbing fine particles are dispersed in water or an organic solvent containing water to prepare an infrared absorbing fine particle dispersion liquid for forming a coating layer (described as "a coating layer-forming dispersion liquid" in the present invention).

On the other hand, the surface treating agent described in "[2]Surface treating agent used for surface coating of infrared absorbing fine particles" is prepared.

Then, a surface treating agent is added to the prepared coating layer-forming dispersion liquid, while mixing and stirring the coating layer-forming dispersion liquid. Then, the surface of the infrared absorbing fine particles is coated with a coating layer containing at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound.

In preparing the coating layer-forming dispersion liquid according to the present invention, it is preferable that the tungsten oxide and/or the composite tungsten oxide, which are the infrared absorbing fine particles, are finely pulverized in advance and dispersed in water or in a suitable organic solvent containing water to be in a monodispersed state. At this time, the dispersion concentration of the tungsten oxide or/and the composite tungsten oxide is preferably 0.01 mass % or more and 80 mass % or less. Within this dispersion concentration range, the liquid stability of the dispersion liquid is excellent. Further, when appropriate liquid medium, dispersant, coupling agent, and surfactant are selected, gelation of the dispersion liquid and sedimentation of particles did not occur for 6 months or more even when placed in a constant temperature bath at a temperature of 40° C., and the dispersed particle size can be maintained in a range of 1 to 200 nm.

Then, it is important that the dispersed state is ensured during the pulverization and dispersion treatment step, and that the fine particles are not aggregated. This is because the following situation can be avoided: in the process of the surface treatment of the infrared absorbing fine particles, which is the next process, the infrared absorbing fine particles cause aggregation, the fine particles are surface-coated in an aggregate state, eventually, the aggregate remains in the infrared absorbing fine particle dispersion body described below, and transparency of the infrared absorbing fine particle dispersion body and an infrared absorbing substrate described below decreases.

Specific methods of the pulverization and dispersion treatment include for example: a pulverization/dispersion treatment method using devices such as bead mill, ball mill, sand mill, paint shaker, ultrasonic homogenizer. Among them, pulverizing and dispersing with a medium stirring mill such as a bead mill, a ball mill, a sand mill, and a paint shaker using medium media such as beads, balls and Ottawa sand, is preferable because the time required to reach a desired dispersed particle size is short.

The surface treating agent is added while mixing and stirring the prepared coating layer-forming dispersion liquid. At this time, it is desirable to dilute the coating layer-forming dispersion liquid to an appropriate concentration using water or an appropriate organic solvent containing water. This is because when the dispersion concentration of the infrared absorbing fine particles tungsten oxide or/and the composite tungsten oxide is diluted to 0.1 mass % or more and 20 mass % or less, more preferably 1 mass % or more and 10 mass % or less, all of the infrared absorbing fine particles are uniformly surface-coated.

Hereinafter, the above addition will be described in an order of (1) A surface coating method for infrared absorbing fine particles using a coating layer-forming dispersion liquid with water as a medium, and (2) A surface coating method for infrared absorbing fine particles using the coating layer-forming dispersion liquid with an organic solvent containing water.

(1) A Surface Coating Method for Infrared Absorbing Fine Particles Using a Coating Layer-Forming Dispersion Liquid with Water as a Medium The present inventors found that in the preparation of the coating layer-forming dispersion liquid described above, it is preferable that while stirring and mixing the coating layer-forming dispersion liquid with water as a medium, the surface treating agent according to the present invention is added thereto, and further, a hydrolysis reaction of the added metal chelate compound and metal cyclic oligomer compound is immediately completed. From a viewpoint of uniformly surface-coating the infrared absorbing fine particles, it is preferable to add the surface treating agent in a dropping manner (dropwise).

It is considered that the preparation of the coating layer-forming dispersion liquid is affected by a reaction sequence of the added surface treating agent according to the present invention. Namely, the hydrolysis reaction of the surface treating agent always precedes the polymerization reaction of the generated hydrolysis product followed by the polymerization reaction of the generated hydrolysis product in the coating layer-forming dispersion liquid with water as a medium. As a result, it is considered that a residual amount of carbon C in the surface treating agent molecules present in the coating layer can be reduced, compared to a case without water as a medium, and it is considered that a high-density coating layer that densely coats the surface of each infrared absorbing fine particle, can be formed by reducing the residual amount of carbon C in the surface treating agent molecules present in the coating layer.

When this surface treating agent is added dropwise, it is also preferable to add dropwise the surface treatment agent itself diluted with an appropriate solvent, to adjust an amount of the surface treating agent added per hour. As a solvent used for dilution, preferably, it does not react with the surface treating agent and has high compatibility with water, which is a medium of the coating layer-forming dispersion liquid. Specifically, alcohol-based, ketone-based, glycol-based solvents and the like can be preferably used.

The dilution ratio of the surface treating agent is not particularly limited. However, the dilution ratio is preferably 100 times or less from a viewpoint of ensuring productivity.

Note that the metal chelate compound, the metal cyclic oligomer compound, the hydrolysis products of them, and polymers of the hydrolysis products are decomposed to metal ions in the above-described coating layer-forming dispersion liquid with water as a medium, immediately after start of the addition. However, in this case, the decomposition to the metal ion ends at the timepoint of a saturated aqueous solution.

On the other hand, the infrared absorbing fine particles according to the present invention maintain dispersion by electrostatic repulsion in the coating layer-forming dispersion liquid with the water as a medium.

As a result, it is considered that surfaces of all infrared absorbing fine particles are coated with at least one selected from hydrolysis product of the metal chelate compound, polymer of hydrolysis product of the metal chelate compound, hydrolysis product of the metal cyclic oligomer compound, and polymer of hydrolysis product of the metal cyclic oligomer compound, and the surface-treated infrared absorbing fine particles according to the present invention are generated.

(2) A Surface Coating Method for Infrared Absorbing Fine Particles Using the Coating Layer-Forming Dispersion Liquid with an Organic Solvent Containing Water As a modified example of the surface coating method for the infrared absorbing fine particles using the coating layer-forming dispersion liquid with water as a medium described above, preferably there is also a method for achieving the above-described reaction sequence while adjusting the addition amount of water to an appropriate value, using an organic solvent containing water as the medium in the coating layer-forming dispersion liquid.

This preparation method is suitable when it is desired to reduce the amount of water contained in the coating layer-forming dispersion liquid due to the convenience of a subsequent step.

Specifically, the surface treating agent according to the present invention and pure water are dropped in parallel while stirring and mixing the coating layer-forming dispersion liquid with organic solvent as a medium. In this event, the temperature of the medium, which affects a reaction rate, and a dropping rate of the surface treating agent and pure water are appropriately controlled. Note that as the organic solvent, any solvent such as an alcohol-based, ketone-based, or glycol-based solvent that dissolves in water at room temperature may be used, and various solvents can be selected.

And also in the above "(2)", when adding the surface treating agent dropwise, it is preferable to add dropwise the surface treating agent itself diluted with an appropriate solvent in order to adjust the amount of the surface treating agent added per hour. In this case, as a solvent used for dilution, it is preferable to use a solvent that does not react with the surface treating agent and has high compatibility with the organic solvent containing water, which is a medium of the coating layer-forming dispersion liquid. Specifically, alcohol-based, ketone-based, glycol-based solvents and the like can be preferably used.

Regarding a measure at the time of using a commercially available metal chelate compound or metal cyclic oligomer compound as the surface treating agent, and regarding the dilution ratio of the surface treating agent, the same thing can be said as in the above "(1)".

[4] Method for Producing Surface-Treated Infrared Absorbing Fine Particle Powder The surface-treated infrared absorbing fine particle powder according to the present invention can be obtained by surface-coating the infrared absorbing fine particles in the coating layer-forming dispersion liquid, then, removing the solvent in the dispersion liquid (a mixture of the coating layer-forming dispersion liquid, surface treating agent, and solvent such as water) by an appropriate drying treatment. As a drying treatment facility, air dryer, universal mixer, ribbon type mixer, vacuum flow dryer, vibration flow dryer, freeze dryer, ribocorn, rotary kiln, spray dryer, parcon dryer, etc., are preferable, from a viewpoint that heating and/or decompression is possible, and the ultrafine particles can be easily mixed and recovered. However, the drying treatment facility is not limited thereto.

When the infrared absorbing fine particles are composite tungsten oxide fine particles, it is desirable to perform the drying treatment at a temperature higher than a temperature at which the solvent in the dispersion liquid is volatilized, and at a temperature at which the element M does not desorb even in the air atmosphere, and it is desirable that the temperature is 150° C. or lower.

[5] Heat Treatment of the Surface-Treated Infrared Absorbing Fine Particle Powder As described in "[2] Surface treating agent used for surface coating of infrared absorbing fine particles (4)", when the coating layer in the surface-treated infrared absorbing fine particles or the surface-treated infrared absorbing fine particle powder contains an undecomposed metal chelate compound and/or a metallic cyclic oligomer compound, it is preferable to proceed with a decomposition of the chelate compound and/or the oligomer compound by heat treatment.

The heat treatment is performed in the air atmosphere or an inert gas atmosphere. At this time, the heat treatment temperature is preferably equal to or higher than the temperature at which the metal chelate compound and/and the metallic cyclic oligomer compound are decomposed, and lower than the temperature at which the infrared absorbing fine particles begin to crystallize. Specifically, when the infrared absorbing fine particles are the tungsten oxide fine particles or the composite tungsten oxide fine particles, the temperature is preferably in a temperature range of 200° C. or higher and less than 500° C.

When the infrared absorbing fine particles are the composite tungsten oxide fine particles, it is desirable to perform heat treatment so that the element M does not desorb, and the heat treatment atmosphere is preferably an inert gas atmosphere.

By this temperature control, the surface-treated infrared absorbing fine particles according to the present invention can be obtained by proceeding with the decomposition of the undecomposed metal chelate compound and/or the metal cyclic oligomer compound without growing the infrared absorbing fine particles.

[6] Surface-Treated Infrared Absorbing Fine Particle Dispersion Liquid

The surface-treated infrared absorbing fine particle dispersion liquid according to the present invention can be obtained, using the surface-treated infrared absorbing fine particle powder according to the present invention described in the "[4] Method for producing surface-treated infrared absorbing fine particle powder" and "[5] Heat treatment of surface-treated infrared absorbing fine particle powder".

In the surface-treated infrared absorbing fine particle dispersion liquid according to the present invention, the surface-treated infrared absorbing fine particles according to the present invention are dispersed in a liquid medium and contain a glass coating agent, and if desired, it further contains an acid, a dispersant, and other additives, and is used as a coating liquid. As the liquid medium, one or more liquid media selected from organic solvents, fats and oils, liquid plasticizers, compounds polymerized by curing, and water can be preferably used.

The surface-treated infrared absorbing fine particle dispersion liquid according to the present invention will be described hereafter in an order of (1) Organic solvent, (2) Fats and oils, (3) Liquid plasticizer, (4) Glass coating agent, (5) Acid, (6) Dispersant, (7) Other additives, and (8) A method for producing a surface-treated infrared absorbing fine particle dispersion liquid, which can be preferably used.

(1) Organic Solvent

As the organic solvent used for the surface-treated infrared absorbing fine particle dispersion liquid according to the present invention, alcohol-based, ketone-based, hydrocarbon-based, glycol-based, water-based, and the like can be used.

Specifically, alcoholic solvents such as methanol, ethanol, 1-propanol, isopropanol, butanol, pentanol, benzyl alcohol, diacetone alcohol;

ketone solvents such as acetone, methyl ethyl ketone, dimethyl ketone, methyl propyl ketone, methyl isobutyl ketone, cyclohexanone, isophorone;

ester solvents such as 3-methyl-methoxy-propionate and N-Butyl acetate;

glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate;

amides such as formamide, N-methylformamide, dimethylformamide, dimethylacetamide, N-methyl-2-pyrrolidone;

aromatic hydrocarbons such as toluene and xylene;

ethylene chloride, chlorobenzene, etc., can be used.

Then, among these organic solvents, particularly, dimethyl ketone, methyl ethyl ketone, methyl isobutyl ketone, toluene, propylene glycol monomethyl ether acetate, n-butyl acetate, etc., can be preferably used.

(2) Fats and Oils

As fats and oils used for the surface-treated infrared absorbing fine particle dispersion liquid according to the present invention, vegetable fats and oils or compounds of vegetable-derived fats and oils are preferable.

As vegetable oil, dry oils such as linseed oil, sunflower oil, tung oil, eno oil, semi-dry oils such as sesame oil, cottonseed oil, rapeseed oil, soybean oil, rice bran oil, poppy oil, non-dry oils such as olive oil, coconut oil, palm oil, dehydrated castor oil, and the like can be used.

As compounds derived from the vegetable oils, fatty acid monoesters, ethers, etc. obtained by directly esterifying fatty acids of the vegetable oils with monoalcohols, can be used.

Further, commercially available petroleum solvents can also be used as fats and oils.

As a commercially available petroleum solvent, Isopar (registered trademark) E, Exol (registered trademark) Hexane, Exol Heptane, Exol E, Exol D30, Exol D40, Exol D60, Exol D80, Exol D95, Exol DI 10, Exol D130 (all manufactured by ExxonMobil), etc., can be used.

(3) Liquid Plasticizer

As the liquid plasticizer added to the surface-treated infrared absorbing fine particle dispersion liquid according to the present invention, for example, a plasticizer that is a compound of a monohydric alcohol and an organic acid ester, an ester-based plasticizer such as a polyhydric alcohol organic acid ester compound, a phosphoric acid plasticizer such as an organic phosphoric acid plasticizer, etc., can be used. Note that those which are liquid at room temperature are preferable.

Among them, a plasticizer which is an ester compound synthesized from a polyhydric alcohol and a fatty acid can be used. The ester compound synthesized from polyhydric alcohol and fatty acid is not particularly limited, and it is possible to use for example, glycols such as triethylene glycol, tetraethylene glycol, and tripropylene glycol, a glycol ester compound obtained by a reaction between glycols such as triethylene glycol, tetraethylene glycol, tripropylene glycol, and monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid, and also possible to use ester compounds of tetraethylene glycol and tripropylene glycol with the above-described monobasic organic compounds.

Among them, fatty acid esters of triethylene glycol such as triethylene glycol dihexanate, triethylene glycol di-2-ethyl butyrate, and triethylene glycol di-octanoate, triethylene glycol di-2-ethyl hexanonate, can be used. Further, fatty acid esters of triethylene glycol can also be preferably used.

(4) Glass Coating Agent

By containing a glass coating agent in the surface-treated infrared absorbing fine particle dispersion liquid according to the present invention, abrasion resistance can be imparted to the infrared absorbing transparent substrate according to the present invention. From this viewpoint, it is preferable that the surface-treated infrared absorbing fine particle dispersion liquid according to the present invention further contains a glass coating agent.

As a glass coating agent to be contained, for example, a metal alkoxide or a metal organic compound containing one or more of Sn, Ti, In, Si, Zr, and Al can be used. Of these, a compound containing Si is preferable, and it is preferable to use an organosilicon compound having a silane coupling agent, a silane alkoxide, a polyorganosiloxane, polysilazane, and an organic group bonded to a silicon atom, with one or more of the organic groups being an organic group having a reactive functional group. All of them are preferably liquid at room temperature.

As the polysilazane, for example, perhydropolysilazane, partially organic polysilazane, organosilazane and the like can be used.

As the organosilicon compound which has an organic group bonded to a silicon atom, with one or more of the organic groups being an organic group having a reactive functional group, Si-containing compounds having an amino group, a mercapto group, an epoxy group and a (meth) acryloyloxy group as reactive groups are preferable. For example, 3-(meta) acryloyloxypropyltrimethoxysilane, 3-(meth) acryloyloxypropyltriethoxysilane, 3-(Meta) acryloyloxypropylmethyldimethoxysilane, 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, 3-Ureidopropyltriethoxysilane, N-(N-vinylbenzyl-2-aminoethyl)-3-aminopropyltrimethoxysilane, N-phenyl-3-aminopropyltrimethoxysilane, 3-mercaptopropyltrimethoxysilane, 3-Mercaptopropyltriethoxysilane, 3-mercaptopropylmethyldimethoxysilane, 3-Mercaptopropylmethyldiethoxysilane, 3-glycidoxypropyltrimethoxysilane, 3-glycidoxypropylmethyldimethoxysilane, 3-glycidoxypropyltriethoxysilane, 3-isocyanatepropyltrimethoxysilane, 3-isocyanatepropyltriethoxysilane, 3-Isocyanatepropylmethyldimethoxysilane, 3-Isocyanatepropylmethyldiethoxysilane, etc., can be used.

When the glass coating agent is one or more selected from silane coupling agents and silane alkoxides, it is preferable that the liquid medium is one or more selected from aromatic hydrocarbons, ketones, ethers, alcohols, and water. Further, when the glass coating agent is one or more selected from polysilazane and polyorganosilane, it is preferable that the liquid medium is one or more selected from aromatic hydrocarbons, ketones, and ethers.

(5) Acid

It is also a preferable configuration to add an acid to the surface-treated infrared absorbing fine particle dispersion liquid according to the present invention, from a viewpoint of promoting a hydrolysis of a hydrolyzable silicon monomer and the like contained in the above-described glass coating agent.

As the acid added to the surface-treated infrared absorbing fine particle dispersion liquid according to the present invention, for example, nitric acid, hydrochloric acid, sulfuric acid, trichloroacetic acid, trifluoroacetic acid, phosphoric acid, methanesulfonic acid, paratoluenesulfonic acid, oxalic acid, etc., can be used. Volatile acids are preferable because they volatilize during heating and do not remain in the layer after curing.

The acid acts as a catalyst that promotes the hydrolysis of the hydrolyzable silicon monomer and a hydrolyzed condensate of the silicon monomer. The addition amount of the acid into the dispersion liquid can be set without particular limitation as long as the role of the catalyst can be satisfied, but a volume ratio is preferably about 0.001 to 0.1 mol/L with respect to a total amount of the dispersion liquid.

(6) Dispersant

In the surface-treated infrared absorbing fine particle dispersion liquid according to the present invention, it is also preferable to add various dispersants, surfactants, coupling agents, and the like, into the infrared absorbing fine particle dispersion liquid according to the present invention, in order to further improve the dispersion stability of the surface-treated infrared absorbing fine particles and avoid coarsening of the dispersed particle size due to re-aggregation.

The dispersant, coupling agent and surfactant can be selected according to the application, but those having an amine-containing group, a hydroxyl group, a carboxyl group or an epoxy group as a functional group are preferable. These functional groups have an effect of adsorbing on the surface of the surface-treated infrared absorbing fine particles to prevent aggregation and disperse them uniformly. Polymeric dispersants having any of these functional groups in the molecule are more preferable.

As preferable specific examples of commercially available dispersants,

SOLSERSE (registered trademark) manufactured by Lubrizol 3000, 9000, 11200, 13000, 13240, 13650, 13940, 16000, 17000, 18000, 20000, 21000, 24000SC, 24000GR, 26000, 27000, 28000, 31845, 32000, 32500, 32550, 32600, 33000, 33500, 34750, 35100, 35200, 36600, 37500, 38500, 39000, 41000, 41090, 53095, 55000, 56000, 76500, etc.;

Disperbyk (registered trademark) manufactured by Big Chemie Japan Co., Ltd.-101, 103, 107, 108, 109, 110, 111, 112, 116, 130, 140, 142, 145, 154, 161, 162, 163, 164, 165, 166, 167, 168, 170, 171, 174, 180, 181, 182, 183, 184, 185, 190, 2000, 2001, 2020, 2025, 2050, 2070, 2095, 2150, 2155, Anti-Terra(registered trademark)-U, 203, 204, BYK(registered trademark)-P104, P104S, 220S, 6919, etc.;

EFKA (registered trademark) manufactured by Fuka Additives—4008, 4046, 4047, 4015, 4020, 4050, 4055, 4060, 4080, 4300, 4330, 4400, 4401, 4402, 4403, 4500, 4510, 4530, 4550, 4560, 4585, 4800, 5220, 6230, JONCRYL (registered trademark) manufactured by BASF Japan Ltd.-67, 678, 586, 611, 680, 682, 690, 819, JDX5050, etc.;

TERPLUS (registered trademark) manufactured by Otsuka Chemical Co., Ltd-MD 1000, D 1180, D 1330, etc.; and Ajispar (registered trademark) manufactured by Ajinomoto Fine-Techno Co., Ltd.-PB-711, PB-821, PB-822, etc., can be used.

(7) Other Additives

In order to control coatability, leveling property, and dryness, the surface-treated infrared absorbing fine particle dispersion liquid according to the present invention may contain small amounts of various surfactants and resin components in a range of 5 mass % or less of the dispersion liquid. Surfactants include anionic, cationic, nonionic or amphoteric ones.

Further, in order to impart flexibility of the infrared absorbing transparent substrate obtained by using the dispersion liquid, various organic resins such as silicone resin, acrylic resin, polyester resin, polyurethane resin, hydrophilic organic resin containing polyoxyalkylene group, and epoxy resin may be contained in a small amount in a range of 5 mass % or less of the dispersion liquid.

Further, in order to impart crack prevention property to the obtained infrared absorbing transparent substrate, thermosetting resin, thermoplastic resin, ultraviolet curable resin and the like may be contained in a range of 20 mass % or less of the dispersion liquid. More specifically, the resins are acrylic resin, epoxy resin, polyester resin, amino resin, urethane resin, furan resin, silicone resin and modified products of these resins.

(8) A Method for Producing a Surface-Treated Infrared Absorbing Fine Particle Dispersion Liquid To produce the surface-treated infrared absorbing fine particle dispersion liquid according to the present invention, the surface-treated infrared absorbing fine particles according to the present invention, a glass coating agent, and if necessary, a dispersant and/or other additives may be added and dispersed together in the liquid medium. An examples of a method for dispersing include a specific method of pulverization/dispersion treatment described in "[3] Method for surface coating of infrared absorbing fine particles". However, when primary particles in the surface-treated infrared absorbing fine particles are excessively pulverized by pulverization/dispersion treatment, there is a risk that an uncoated new surface will appear and the moisture/heat resistance will not be guaranteed. Therefore, it is preferable that the pulverization/dispersion treatment is limited to a minimum dispersion.

The above-described "(5) acid" is preferably added at a final stage of production of the dispersion liquid, from a viewpoint of suppressing excessive reaction with the glass coating agent.

[7] Infrared Absorbing Transparent Substrate

The infrared absorbing transparent substrate according to the present invention has a coating layer on at least one side of the transparent substrate, the coating layer being formed by using the surface-treated infrared absorption fine particle dispersion liquid according to the present invention as a coating liquid. The coating layer is a cured glass coating agent in which surface-treated infrared absorbing fine particles according to the present invention are dispersed.

The infrared absorbing transparent substrate according to the present invention has excellent moisture/heat resistance and chemical stability, and can be suitably used as an infrared absorbing material.

The infrared absorbing transparent substrate according to the present invention will be described in an order of (1) A transparent substrate used for an infrared absorbing transparent substrate, (2) A method for producing the infrared absorbing transparent substrate, (3) Moisture/heat resistance property of the infrared absorbing transparent substrate, (4) Measurement of a thickness of the coating layer on the infrared absorbing transparent substrate.

(1) A Transparent Substrate Used for an Infrared Absorbing Transparent Substrate As the transparent substrate, a transparent glass substrate or a transparent resin substrate can be used, and there is no particular limitation as long as it does not cause any problem in a surface condition and durability of the required board, sheet, and film.

Specific examples of the transparent glass substrate include functional glass such as clear glass and green glass.

Specific examples of the transparent resin substrate include a board, a sheet, and a film, including polyester-based polymers such as polyethylene terephthalate, polyethylene naphthalate; cellulose-based polymers such as diacetyl cellulose, triacetyl cellulose; polycarbonate-based polymers; acrylic polymers such as polymethyl methacrylate; styrenic polymers such as polystyrene, acrylonitrile-styrene copolymers; olefinic polymers such as polyethylene, polypropylene, polyolefin having a cyclic or norbornene structure, ethylene-propylene copolymers; vinyl chloride-based polymers; amide-based polymers such as aromatic polyamide; imide-based polymers; sulfone-based polymers; polyethersulfone-based polymers; polyetheretherketone-based polymers; polyphenylene sulfide-based polymers; vinyl alcohol-based polymers; vinylidene chloride-based polymers; vinyl butyral-based polymers; allylate-based polymers; polyoxymethylene-based polymers; epoxy-based polymers; and various binary, ternary copolymers, graft copolymers, and blends thereof.

(2) A Method for Producing the Infrared Absorbing Transparent Substrate

The infrared absorbing transparent substrate in which surface-treated infrared fine particles according to the present invention are dispersed in a solid medium, can be produced by forming a coating layer on a transparent substrate by a known method using the surface-treated infrared absorbing fine particle dispersion liquid according to the present invention, and curing it by a predetermined method. Examples of the curing method include a method of curing by drying treatment, irradiation with ultraviolet rays or electron beams, heat treatment and the like.

Of these, it is preferable to use a method of curing the glass coating agent by heat treatment after forming the coating layer using the surface-treated infrared absorbing fine particle dispersion liquid containing a glass coating agent. This is because the infrared absorbing transparent substrate can be imparted with abrasion resistance by adopting this configuration. The heat treatment temperature after forming the coating layer is preferably 100° C. or higher and 600° C. or lower, more preferably, it is a boiling point or more of the solvent in the coating liquid and less than 500° C. This is because when the heat treatment temperature is 100° C. or higher, the polymerization reaction of the metal alkoxide and/or the hydrolyzed polymer of the metal alkoxide contained in the coating layer can be completed. Further, this is because when the heat treatment temperature is 100° C. or higher, water or the organic solvent as a solvent does not remain in the coating layer, and therefore these solvents do not cause a decrease of visible light transmittance, and on the other hand, when the heat treatment temperature is 600° C. or lower, thermal deterioration of the surface-treated infrared absorbing fine particles can be suppressed.

(3) Moisture/Heat Resistance Property of the Infrared Absorbing Transparent Substrate When the visible light transmittance is set to around 80% and exposure is performed for 9 days in a moist heat atmosphere with a temperature of 85° C. and a relative humidity of 90%, the infrared absorbing transparent substrate according to the present invention has an excellent moisture/heat resistance, with a change in solar transmittance of 4.0% or less before and after the exposure.

(4) Measurement of a Thickness of the Coating Layer on the Infrared Absorbing Transparent Substrate A stylus type surface roughness meter or the like can be used for measuring a thickness of the coating layer on the infrared absorbing transparent substrate according to the present invention. Specifically, a surface-treated infrared absorbing fine particle dispersion liquid is applied onto a predetermined smooth substrate to obtain a coating layer. Before the coating layer is cured, a part of the coating layer is peeled off using a razor. The peeled coating layer before curing is placed on another smooth substrate and cured by an appropriate method to form a coating layer, then, a layer thickness can be obtained by measuring a step between the substrate and the coating layer using the stylus type surface roughness meter.

EXAMPLES

The present invention will be specifically described hereafter, with reference to examples. However, the present invention is not limited to the following examples.

A dispersed particle size of fine particles in the coating layer-forming dispersion liquid and in the surface-treated infrared absorbing fine particle dispersion liquid in Examples and Comparative Examples was shown by an average value measured by a particle size measuring device (ELS-8000 manufactured by Otsuka Electronics Co., Ltd.) based on a dynamic light scattering method. Further, a crystallite size was measured by powder X-ray diffraction (0-20 method) using a powder X-ray diffractometer (X'Pert-PRO/MPD manufactured by SPECTALIS, Inc., PANalytical) and calculated using a Rietveld method.

A thickness of the coating layer of the surface-treated infrared absorbing fine particles was obtained by reading an unobserved part of lattice fringes of the infrared absorbing fine particles as a coating layer, from 300,000-fold photographic data obtained using a transmission electron microscope (Hitachi Ltd. HF-2200).

The thickness of the coating layer on the infrared absorbing transparent substrate according to the present invention was measured using a stylus type surface roughness meter (SURFCOM-5000DX manufactured by Tokyo Seimitsu Co., Ltd.).

First, a surface-treated infrared absorbing fine particle dispersion liquid is applied onto a glass substrate having a thickness of 3 mm using a predetermined bar coater to form a coating layer. Before the coating layer is cured, a part of the coating layer is peeled off using a razor. The peeled coating layer before curing is placed on another smooth glass substrate and cured by an appropriate method such as heat treatment to form a coating layer and obtain an infrared absorbing transparent substrate. Then, the step between the glass substrate and the coating layer is measured using a stylus type surface roughness meter to obtain the layer thickness of the coating layer.

Optical properties of the infrared absorbing transparent substrate were measured using a spectrophotometer (U-4100 manufactured by Hitachi, Ltd.), and a visible light transmittance and a solar transmittance were calculated according to JISR3106. A haze value of the infrared absorbing transparent substrate was measured using a haze meter (HM-150, manufactured by Murakami Color Co., Ltd.) and calculated according to JIS K7105.

As a method for evaluating a moisture/heat resistance of the infrared absorbing transparent substrate, the infrared absorbing transparent substrate having a visible light transmittance of about 80% is exposed to a humid atmosphere at temperature of 85° C. and humidity of 90% for 9 days, and, for example, in the case of hexagonal cesium tungsten bronze, those having a change in solar transmittance of 4.0% or less before and after the exposure were judged to have good moisture/heat resistance, those having a change amount exceeding 4.0% were judged to have insufficient moisture/heat resistance.

Example 1

25 mass % of hexagonal cesium tungsten bronze with Cs/W (molar ratio)=0.33 ($Cs_{0.33}WO_z$, $2.0 \leq z \leq 3.0$) powder (YM-01 manufactured by Sumitomo Metal Mining Co., Ltd., $2.0 \leq Z \leq 3.0$) and 75 mass % of pure water were mixed to obtain a mixture, and the mixture was charged into a paint shaker containing 0.3 mm$\varphi$$ZrO_2$ beads, and pulverized and dispersed for 10 hours, to obtain a $Cs_{0.33}WO_z$ fine particle dispersion liquid according to Example 1. The dispersed particle size of $Cs_{0.33}WO_z$ fine particles in the obtained dispersion liquid was measured, and it was found to be 100 nm. Note that as a setting for measuring the dispersed particle size, a particle refractive index was set to 1.81, and a particle shape was set to non-spherical. Further, a background was measured with pure water and a solvent refractive index was set to 1.33. Further, after removing the solvent of the obtained dispersion liquid, the crystallite diameter of $Cs_{0.33}WO_z$ fine particles was measured, and it was found to be 32 nm.

The obtained $Cs_{0.33}WO_z$ fine particle dispersion liquid was mixed with pure water, to obtain a dispersion liquid A for forming a coating layer according to Example 1 (referred to as a coating layer-forming dispersion liquid A hereafter) in which a concentration of the $Cs_{0.33}WO_z$ fine particles was 2 mass %.

On the other hand, 2.5 mass % of aluminum ethyl acetoacetate diisopropylate as an aluminum chelate compound and 97.5 mass % of isopropyl alcohol (IPA) were mixed, to obtain a surface treating agent diluted solution according to Example 1.

890 g of the obtained coating layer-forming dispersion liquid A was put in a beaker, and 360 g of the surface treating agent diluted solution a was added thereto dropwise over 3 hours while performing strong stirring with a stirrer with blades.

After the dropwise addition of the surface treating agent diluted solution a, stirring was further performed at a temperature of 20° C. for 24 hours, to produce a ripened liquid according to Example 1. Subsequently, a medium is evaporated from the ripened liquid using vacuum fluidized drying, the obtained dry solid material was heat-treated at 200° C. for 1 hour in a nitrogen gas atmosphere, and the obtained powdery material was dry-pulverized with a hammer mill, to obtain a powder containing the surface-treated infrared absorbing fine particles according to Example 1 (surface-treated infrared absorbing fine particle powder).

Here, the thickness of the coating layer of the surface-treated infrared absorbing fine particles according to Example 1 was measured using a transmission electron micrograph of 300,000 magnification shown in FIG. 2, and it was found to be 2 nm (a layer thickness of a portion sandwiched between two parallel solid lines, in which the lattice fringes (arrangement of atoms in the crystal) of the $Cs_{0.33}Wo_z$ fine particles according to Example 1 are not observed).

10 g of the surface-treated infrared absorbing fine particle powder according to Example 1 was mixed with 23 g of isopropyl alcohol, 16 g of tetramethoxysilane, 10 g of 3-glycidoxypropyltrimethoxysilane, to obtain a mixed solution. The obtained mixed solution was loaded into a paint shaker containing 0.3 mm$\varphi$$ZrO_2$ beads and pulverized and dispersed for 1 hour. Then, 40 g of 0.1 mol/liter nitric acid was added, and the mixture was stirred at a temperature of 20° C. for 1 hour to obtain a surface-treated infrared absorbing fine particle dispersion liquid according to Example 1.

After removing the solvent of the obtained surface-treated infrared absorbing fine particle dispersion liquid, the crystallite size of the surface-treated infrared absorbing fine particles was measured and found to be 28 nm.

Tetramethoxysilane and 3-glycidoxypropyltrimethoxysilane are glass coating agents for silane-based alkoxides.

The surface-treated infrared absorbing fine particle dispersion liquid according to Example 1 was applied onto a glass substrate having a thickness of 3 mm using a bar coater (IMC-700 manufactured by Imoto Seisakusho) to form a coating layer. This coating layer is heated at 150° C. for 30 minutes to form a coating layer and obtain an infrared absorbing transparent substrate according to Example 1. Further, the thickness of the coating layer was measured and found to be 3 μm.

Optical properties of the obtained infrared absorbing transparent substrate according to Example 1 were measured, and it was found that the visible light transmittance was 79.7%, the solar transmittance was 46.6%, and the haze was 0.4%.

After the obtained infrared absorbing transparent substrate according to Example 1 was exposed to a humid atmosphere at temperature of 85° C. and relative humidity of 90% for 9 days, and optical properties were measured, and it was found that the visible light transmittance was 82.8%, the solar transmittance was 50.5%, and the haze was 0.4%. It was also found that the change in visible light transmittance due to exposure to humid atmosphere was 3.1%, and the change in solar transmittance was 3.9%, both of which were small, and the haze did not change.

The production conditions for the surface-treated infrared-absorbing fine particle powder according to Example 1 are shown in Table 1, production conditions for the surface-treated infrared absorbing fine particle dispersion liquid according to Example 1 are shown in Table 2, and optical property evaluation results of the infrared absorbing transparent substrate according to Example 1 are shown in Table 3.

Examples 2 and 3

Surface-treated infrared absorbing fine particle powder, surface-treated infrared absorbing fine particle dispersion liquid, and an infrared absorbing transparent substrate according to Examples 2 and 3 were obtained in the same manner as in Example 1 except that the amount of the surface treating agent diluted solution a and the dropping addition time were changed, and the same evaluation as in Example 1 was performed.

The production conditions for the surface-treated infrared-absorbing fine particle powder according to Examples 2 and 3 are shown in Table 1, production conditions for the surface-treated infrared absorbing fine particle dispersion liquid according to Examples 2 and 3 are shown in Table 2, and optical property evaluation results of the infrared absorbing transparent substrate according to Examples 2 and 3 are shown in Table 3.

Example 4

A ripened liquid according to Example 1 was allowed to stand for 1 hour to separate the surface-treated infrared absorbing fine particle powder and the medium into solid and liquid. Then, only the medium which was a supernatant was removed to obtain an infrared absorbing fine particle slurry. The obtained infrared absorbing fine particle slurry was dried in an air atmosphere at 80° C. for 3 hours, and the obtained powdery material was dry-pulverized with a hammer mill to obtain a surface-treated infrared absorbing fine particle powder according to Example 4.

A surface-treated infrared absorbing fine particle dispersion liquid and an infrared absorbing transparent substrate according to Example 4 were obtained in the same manner as in Example 1 except that the surface-treated infrared absorbing fine particle powder according to Example 4 was used instead of the surface-treated infrared absorbing fine particle powder according to Example 1, and the same evaluation as in Example 1 was performed.

The production conditions for the surface-treated infrared absorbing fine particle powder according to Example 4 are shown in Table 1, production conditions for the surface-treated infrared absorbing fine particle dispersion liquid according to Example 4 are shown in Table 2, and optical property evaluation results of the infrared absorbing transparent substrate according to Example 4 are shown in Table 3.

Example 5

2.4 mass % of zirconium tributoxyacetylacetonate and 97.6 mass % of isopropyl alcohol were mixed to obtain a surface treating agent b according to Example 5. A surface-treated infrared absorbing fine particle powder, a surface-treated infrared absorbing fine particle dispersion liquid, and an infrared absorbing transparent substrate according to Example 5 were obtained in the same manner as in Example 1 except that the surface treating agent b was used instead of the surface treating agent a, and the same evaluation as in Example 1 was performed.

The production conditions for the surface-treated infrared absorbing fine particle powder according to Example 5 are shown in Table 1, production conditions for the surface-treated infrared absorbing fine particle dispersion liquid according to Example 5 are shown in Table 2, and optical property evaluation results of the infrared absorbing transparent substrate according to Example 5 are shown in Table 3.

Example 6

2.6 mass % of diisopropoxytitanium bisethylacetoacetate and 97.4 mass % of isopropyl alcohol were mixed to obtain a surface treating agent c according to Example 6.

A surface-treated infrared absorbing fine particle powder, a surface-treated infrared absorbing fine particle dispersion liquid, and an infrared absorbing transparent substrate according to Example 6 were obtained in the same manner as in Example 1 except that the surface treating agent c was used instead of the surface treating agent a, and the same evaluation as in Example 1 was performed.

The production conditions for the surface-treated infrared absorbing fine particle powder according to Example 6 are shown in Table 1, production conditions for the surface-treated infrared absorbing fine particle dispersion liquid according to Example 6 are shown in Table 2, and optical property evaluation results of the infrared absorbing transparent substrate according to Example 6 are shown in Table 3.

Example 7

25 mass % of cubic sodium tungsten bronze powder with Na/W (molar ratio)=0.33 (manufactured by Sumitomo Metal Mining Co., Ltd.) and 75 mass % of isopropyl alcohol were mixed, and the obtained mixture was charged into a paint shaker containing 0.3 mmφ $ZrO_2$ beads, and pulverized and dispersed for 10 hours, to obtain a $Na_{0.33}WO_z$ fine particle dispersion liquid according to Example 7. The dispersed particle size of the $Na_{0.33}WO_z$ fine particles in the obtained dispersion liquid was measured, and it was found to be 100 nm. Note that as a setting for measuring the dispersed particle size, a particle refractive index was set to 1.81, and a particle shape was set to non-spherical. Further, a background was measured with isopropyl alcohol and a solvent refractive index was set to 1.38. Further, after removing the solvent of the obtained dispersion liquid, the crystallite size of the $Na_{0.33}Wo_z$ fine particles according to Example 7 was measured and found to be 32 nm.

The $Na_{0.33}WO_z$ fine particle dispersion liquid according to Example 7 was mixed with isopropyl alcohol, to obtain a coating layer-forming dispersion liquid B in which a concentration of the infrared absorbing fine particles (cubic sodium tungsten bronze fine particles) was 2 mass %. 520 g of the obtained coating layer-forming dispersion liquid B was put in a beaker, and as described in Example 1, 360 g of the surface treating agent a and 100 g of pure water were added thereto dropwise over 3 hours while performing strong stirring with a stirrer with blades. After the dropwise addition, stirring was performed at a temperature of 20° C. for 24 hours, to produce a ripened liquid according to Example 7. Subsequently, a medium was evaporated from the ripened liquid by vacuum fluidized drying, the obtained dry matter was heat-treated at 200° C. for 1 hour in a nitrogen gas atmosphere, and the obtained powder was dry-pulverized with a hammer mill, to obtain a surface-treated infrared absorbing fine particle powder according to Example 7.

A surface-treated infrared absorbing fine particle dispersion liquid, and an infrared absorbing transparent substrate according to Example 7 were obtained in the same manner as in Example 1 except that the surface-treated infrared absorbing fine particle powder according to Example 7 was used instead of the surface-treated infrared absorbing fine particle powder according to Example 1, and the same evaluation as in Example 1 was performed.

The production conditions for the surface-treated infrared absorbing fine particle powder according to Example 7 are shown in Table 1, production conditions for the surface-treated infrared absorbing fine particle dispersion liquid are shown in Table 2, and optical property evaluation results of the infrared absorbing transparent substrate are shown in Table 3.

Examples 8 to 10

The dispersed particle size and the crystallite size of the infrared absorbing fine particles were measured in the same manner as in Example 1 except that the hexagonal potassium tungsten bronze powder with K/W (molar ratio)=0.33 (Example 8), the hexagonal rubidium tungsten bronze powder with Rb/W (molar ratio)=0.33 (Example 9), and magneli phase $W_{18}O_{49}$ (Example 10) (manufactured by Sumitomo Metal Mining Co., Ltd.) were used instead of the hexagonal cesium tungsten bronze powder, to obtain coating layer-forming dispersion liquids C (Example 8), D (Example 9), and E (Example 10).

A surface-treated infrared absorbing fine particle powder, a surface-treated infrared absorbing fine particle dispersion liquid, an infrared absorbing fine particle dispersion powder, and an infrared absorbing transparent substrate according to Examples 8 to 10 were obtained in the same manner as in Example 1 except that the coating layer-forming dispersion liquids C to E were used instead of the coating layer-forming dispersion liquid A, and the same evaluation was performed.

The production conditions for the surface-treated infrared absorbing fine particle powder according to Examples 8 to 10 are shown in Table 1, production conditions for the surface-treated infrared absorbing fine particle dispersion liquid according to Examples 8 to 10 are shown in Table 2, and optical property evaluation results of the infrared absorbing transparent substrate are shown in Table 3.

Example 11

A surface-treated infrared absorbing fine particle powder, a surface-treated infrared absorbing fine particle dispersion liquid, and an infrared absorbing transparent substrate according to Example 11 were obtained in the same manner as in Example 1 except that 15 g of low temperature curing type perhydropolysilazane (manufactured by AZ-Electronic Materials, trade name: Aquamica NP-110) was used instead of 16 g of tetramethoxysilane and 10 g of 3-glycidoxypropyltrimethoxysilane, and the same evaluation as in Example 1 was performed.

The production conditions for the surface-treated infrared absorbing fine particle powder according to Example 11 are shown in Table 1, production conditions for the surface-treated infrared absorbing fine particle dispersion liquid according to Example 11 are shown in Table 2, and optical property evaluation results of the infrared absorbing transparent substrate according to Example 11 are shown in Table 3.

Note that the low temperature curable perhydropolysilazane is a glass coating agent.

Example 12

309 g of tetraethoxysilane was used as the surface treating agent d.

A surface-treated infrared absorbing fine particle powder, a surface-treated infrared absorbing fine particle dispersion liquid, and an infrared absorbing transparent substrate according to Example 12 were obtained in the same manner as in Example 1 except that the surface treating agent d was used instead of the surface treating agent diluted solution a, and no isopropyl alcohol was added, and the same evaluation as in Example 1 was performed.

The production conditions for the surface-treated infrared absorbing fine particle powder according to Example 12 are shown in Table 1, production conditions for the surface-treated infrared absorbing fine particle dispersion liquid according to Example 12 are shown in Table 2, and optical property evaluation results of the infrared absorbing transparent substrate according to Example 12 are shown in Table 3.

Example 13

4.4 mass % of zinc acetylacetonate and 95.6 mass % of isopropyl alcohol were mixed to obtain a surface treating agent diluted solution e according to Example 13. A surface-treated infrared absorbing fine particle powder, a surface-treated infrared absorbing fine particle dispersion liquid, and an infrared absorbing transparent substrate according to Example 13 were obtained in the same manner as in Example 1 except that the surface treating agent diluted solution e was used instead of the surface treating agent diluted solution a.

The production conditions for the surface-treated infrared absorbing fine particle powder according to Example 13 are shown in Table 1, production conditions for the surface-treated infrared absorbing fine particle dispersion liquid according to Example 13 are shown in Table 2, and optical property evaluation results of the infrared absorbing transparent substrate according to Example 13 are shown in Table 3.

Comparative Example 1

10 g of hexagonal cesium tungsten bronze powder (YM-01 manufactured by Sumitomo Metal Mining Co., Ltd., $2.0 \le Z \le 3.0$) was mixed with 23 g of isopropyl alcohol, 16 g of tetramethoxysilane, and 10 g of 3-glycidoxypropyltrimethoxysilane, and the obtained mixed solution was loaded into a paint shaker containing 0.3 mmφ$ZrO_2$ beads and pulverized and dispersed for 5 hours. Then, 40 g of 0.1 mol/liter nitric acid was added, and the mixture was stirred at a temperature of 20° C. for 1 hour to obtain a surface-treated infrared absorbing fine particle dispersion liquid according to Comparative Example 1. The crystallite size of the hexagonal cesium tungsten bronze particles was measured after removing the solvent of the obtained surface-treated infrared absorbing fine particle dispersion liquid, and found to be 28 nm.

The surface-treated infrared absorbing fine particle dispersion liquid according to Comparative Example 1 was applied on a glass substrate having a thickness of 3 mm with a bar coater (IMC-700 manufactured by Imoto Seisakusho) to form a coating layer. This coating layer was heated at 150° C. for 30 minutes to form a cured layer to obtain an infrared absorbing transparent substrate according to Comparative Example 1. Further, the thickness of the coating layer was measured and found to be 3 μm.

Optical properties of the obtained infrared absorbing transparent substrate according to Comparative Example 1 were measured, and it was found that a visible light transmittance was 79.3%, a solar transmittance was 46.1%, and a haze was 0.5%.

The obtained infrared absorbing transparent substrate according to Comparative Example 1 was exposed to a moisture/heat atmosphere with a temperature of 85° C. and a relative humidity of 90% for 9 days, then, its optical properties were measured, and it was found that the visible light transmittance was 83.3%, the solar transmittance was 52.5%, and the haze was 0.9%. The change in visible light transmittance due to exposure to a humid atmosphere was 4.0%, the change in solar transmittance was 6.4%, which were found to be large compared with an Example. Further, the rate of change in haze was 0.4%.

Optical property evaluation result of the infrared absorbing transparent substrate according to Comparative Example 1 are shown in Table 3.

Comparative Examples 2 to 5

An infrared absorbing fine particle dispersion liquid and an infrared absorbing transparent substrate according to Comparative Examples 2 to 5 were obtained in the same manner as in Comparative Example 1 except that cubic sodium tungsten bronze powder with Na/W (molar ratio)= 0.33 (Comparative Example 2), hexagonal potassium tungsten bronze powder with K/W (molar ratio)=0.33 (Comparative Example 3), hexagonal rubidium tungsten bronze powder with Rb/W (molar ratio)=0.33 (Comparative Example 4), or magneli phase $W_{18}O_{49}$ (Comparative Example 5) (manufactured by Sumitomo Metal Mining Co., Ltd.) was used instead of the hexagonal cesium tungsten bronze powder, and the same evaluation as in Example 1 was performed.

An amount of change in visible light transmittance and an amount of change in solar radiation transmittance due to exposure to the moisture/heat atmosphere of the infrared absorbing transparent substrate according to Comparative Examples 2 to 5, were larger than those of Examples. Further, an amount of change in haze of the infrared absorbing transparent substrate according to Comparative Examples 2 to 5 due to exposure to the moisture/heat atmosphere was also larger than those of Examples.

Production conditions for the infrared absorbing fine particle dispersion liquid according to Comparative Examples 2 to 5 are shown in Table 2, and optical property evaluation results of the infrared absorbing transparent substrate are shown in Table 3.

TABLE 1

| | | Coating layer-forming dispersion liquid | | | Surface treating agent diluted solution | | | | | Surface-treated infrared absorbing fine particles |
|---|---|---|---|---|---|---|---|---|---|---|
| | | Infrared absorbing fine particles | Additon amount [mass %] | Dispersion medium | | Surface treating agent Kind | Additon amount [mass %] | IPA Additon amount [mass %] | Drop amount [g] | Drop time [h] | Thickness of coating layer [nm] |
| Example 1 | A | Hexagonal | 2 | Water | a | Aluminum | 2.5 | 97.5 | 360 | 3 | 2 |
| Example 2 | A | cesium | 2 | Water | a | ethyl | 2.5 | 97.5 | 1800 | 15 | 10 |
| Example 3 | A | tungsten | 2 | Water | a | acetoacetate | 2.5 | 97.5 | 3600 | 30 | 20 |
| Example 4 | A | bronze | 2 | Water | a | diisopropylate | 2.5 | 97.5 | 360 | 3 | 2 |
| Example 5 | A | | 2 | Water | b | Zirconium tryptoxyacetylacetone | 2.4 | 97.6 | 360 | 3 | 2 |
| Example 6 | A | | 2 | Water | c | Diisopropoxytitarium biethylacetate acetate | 2.6 | 97.4 | 360 | 3 | 2 |
| Example 7 | B | Cubic sodium tungsten bronze | 2 | IPA | a | Aluminum ethyl acetoacetate diisopropylate/pure water | 2.5 | 97.5 | 360/100 | 3 | 2 |
| Example 8 | C | Hexagonal potassium tungsten bronze | 2 | Water | a | Aluminum ethyl acetoacetate diisopropylate | 2.5 | 97.5 | 360 | 3 | 2 |
| Example 9 | D | Hexagonal potassium tungsten bronze | 2 | Water | a | | 2.5 | 97.5 | 360 | 3 | 2 |

TABLE 1-continued

|  | | Coating layer-forming dispersion liquid | | | Surface treating agent diluted solution | | | | | Surface-treated infrared absorbing fine particles |
|---|---|---|---|---|---|---|---|---|---|---|
|  | | Infrared absorbing fine particles | Additon amount [mass %] | Dispersion medium | Surface treating agent Kind | Additon amount [mass %] | IPA Additon amount [mass %] | Drop amount [g] | Drop time [h] | Thickness of coating layer [nm] |
| Example 10 | E | $W_{18}O_{49}$ | 2 | Water a |  | 2.5 | 97.5 | 360 | 3 | 2 |
| Example 11 | A | Hexagonal cesium tungsten bronze | 2 | Water a |  | 2.5 | 97.5 | 360 | 3 | 2 |
| Example 12 | A | | 2 | Water d | Tetraethyoxysilane | 100 | — | 309 | 3 | 2 |
| Example 13 | A | | 2 | Water e | Zinc acetylacetone | 4.4 | 95.6 | 360 | 3 | 2 |
| Comparative Example 1 | — | Hexagonal cesium tungsten bronze | | | | | | | | |
| Comparative Example 2 | — | Hexagonal sodium tungsten bronze | | | | | | | | |
| Comparative Example 3 | — | Hexagonal potassium tungsten bronze | | | | | | | | |
| Comparative Example 4 | — | Hexagonal rubidium tungsten bronze | | | | | | | | |
| Comparative Example 5 | — | $W_{18}O_{49}$ | | | | | | | | |

In Comparative Examples 1 to 5, coating layer-forming dispersionliquid and a surface treatment diluent are not prepared

TABLE 2

| | Surface-treated infrared absorbing fine particle dispersion liquid | | | | | | |
|---|---|---|---|---|---|---|---|
| | Surface-treated infrared absorbing fine particle powder [g] | Solvent IPA [g] | Glass coating agent Kind | Additon amount [g] | Kind | Additon amount [g] | Acid 0.1 mol/L nitric acid [g] |
| Example 1 | 10 | 23 | Tetra methoxysilane | 16 | 3-glycidoxypropyl trimethoxysilane | 10 | 40 |
| Example 2 | 10 | 23 | | 16 | | 10 | 40 |
| Example 3 | 10 | 23 | | 16 | | 10 | 40 |
| Example 4 | 10 | 23 | | 16 | | 10 | 40 |
| Example 5 | 10 | 23 | | 16 | | 10 | 40 |
| Example 6 | 10 | 23 | | 16 | | 10 | 40 |
| Example 7 | 10 | 23 | | 16 | | 10 | 40 |
| Example 8 | 10 | 23 | | 16 | | 10 | 40 |
| Example 9 | 10 | 23 | | 16 | | 10 | 40 |
| Example 10 | 10 | 23 | | 16 | | 10 | 40 |
| Example 11 | 10 | 23 | Temperature curing type perhydropolysilazane | 15 | — | — | — |
| Example 12 | 10 | 23 | Tetra methoxysilane | 16 | 3-glycidoxypropyl trimethoxysilane | 10 | 40 |
| Example 13 | 10 | 23 | | 16 | | 10 | 40 |

TABLE 2-continued

| | Infrared absorbing fine particle powder [g] | SOLVENT IPA [g] | Glass coating agent Kind | Additon amount [g] | Kind | Additon amount [g] | Acid 0.1 mol/L nitric acid [g] |
|---|---|---|---|---|---|---|---|
| Comparative Example 1 | 10 | 23 | Tetra methoxysilane | 16 | 3-glycidoxypropyl trimethoxysilane | 10 | 40 |
| Comparative Example 2 | 10 | 23 | | 16 | | 10 | 40 |
| Comparative Example 3 | 10 | 23 | | 16 | | 10 | 40 |
| Comparative Example 4 | 10 | 23 | | 16 | | 10 | 40 |
| Comparative Example 5 | 10 | 23 | | 16 | | 10 | 40 |

TABLE 3

| | Optical properties | | | | | | | | | Thickness of coating layer |
|---|---|---|---|---|---|---|---|---|---|---|
| | Initial time* | | | After exposure for 9 days in a moist heat atmosphere | | | Change amount | | | |
| | Visible light transmittance [%] | Solar transmittance [%] | Haze [%] | Visible light transmittance [%] | Solar transmittance [%] | Haze [%] | Visible light transmittance [%] | Solar transmittance [%] | Haze [%] | formed on a transparent substrate [μm] |
| Example 1 | 79.7 | 46.6 | 0.4 | 82.8 | 50.5 | 0.4 | 3.1 | 3.9 | 0.0 | 3 |
| Example 2 | 79.8 | 47.1 | 0.4 | 83.0 | 50.9 | 0.4 | 3.2 | 3.8 | 0.0 | 5 |
| Example 3 | 80.1 | 47.9 | 0.3 | 83.2 | 31.5 | 0.4 | 3.1 | 3.6 | 0.1 | 7 |
| Example 4 | 80.0 | 47.7 | 0.4 | 82.4 | 50.5 | 0.4 | 2.4 | 2.8 | 0.0 | 3 |
| Example 5 | 80.2 | 48.3 | 0.4 | 83.4 | 32.3 | 0.4 | 3.2 | 4.0 | 0.0 | 3 |
| Example 6 | 80.3 | 48.5 | 0.4 | 83.8 | 51.9 | 0.4 | 3.5 | 3.4 | 0.0 | 3 |
| Example 7 | 79.8 | 56.0 | 0.4 | 82.7 | 61.2 | 0.5 | 2.9 | 5.2 | 0.0 | 3 |
| Example 8 | 79.5 | 55.0 | 0.6 | 82.8 | 59.1 | 0.7 | 3.3 | 4.1 | 0.1 | 3 |
| Example 9 | 79.5 | 48.6 | 8.5 | 82.7 | 52.6 | 0.6 | 3.2 | 4.0 | 0.0 | 3 |
| Example 10 | 80.8 | 66.8 | 0.4 | 84.7 | 68.7 | 0.4 | 3.9 | 1.9 | 0.0 | 3 |
| Example 11 | 79.6 | 46.9 | 0.4 | 82.9 | 50.9 | 0.4 | 3.3 | 4.0 | 0.0 | 3 |
| Example 12 | 79.6 | 46.6 | 0.4 | 82.8 | 50,7 | 0.4 | 3.2 | 4.1 | 0.0 | 3 |
| Example 13 | 79.7 | 46,9 | 0.4 | 83.0 | 30.8 | 0.4 | 3.3 | 3.9 | 0.0 | 3 |
| Comparative Example 1 | 79.3 | 46.1 | 0.5 | 83.3 | 52.5 | 0.9 | 4.0 | 6.4 | 0.4 | 3 |
| Comparative Example 2 | 79.5 | 54.3 | 0.5 | 85.2 | 62.3 | 0.9 | 5.7 | 8.0 | 0.4 | 3 |
| Comparative Example 3 | 79.3 | 52.9 | 0.6 | 83.7 | 59.3 | 0.9 | 4.4 | 6.2 | 0.3 | 3 |
| Comparative Example 4 | 79.5 | 47.5 | 6.5 | $3.5 | 53.3 | 0.9 | 4.0 | 5.8 | 0.4 | 3 |
| Comparative Example 5 | 79.7 | 62.0 | 0.5 | 85.8 | 68.1 | 0.9 | 6.1 | 6.1 | 0.4 | 3 |

*Coating layer was heated at 150° C. for 30 minutes after surface-treated infrared absorbing fine particle dispersion liquid is applied onto a glass substrate having a thickness of 3 mm.

DESCRIPTION OF SIGNS AND NUMERALS

11 Octahedron formed by $WO_6$ units
12 Element M

The invention claimed is:

1. A surface-treated infrared absorbing fine particle dispersion liquid in which surface treated infrared absorbing fine particles are dispersed in a liquid medium, wherein
   the surface-treated infrared absorbing fine particles are infrared absorbing fine particles, each surface of which is coated with a coating layer containing at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound, wherein a thickness of the coating layer is 0.5 nm or more and 2 nm or less,
   the surface-treated infrared absorbing fine particle dispersion liquid contains a glass coating agent selected from the group consisting of silane coupling agents, polysilazane, and polyorganosilane, and
   the glass coating agent is liquid at room temperature.

2. The surface-treated infrared absorbing fine particle dispersion liquid according to claim 1, wherein the metal chelate compound or the metal cyclic oligomer compound contains at least one metal element selected from Al, Zr, Ti, Si, Zn.

3. The surface-treated infrared absorbing fine particle dispersion liquid according to claim 1, wherein the metal chelate compound or the metal cyclic oligomer compound has at least one selected from an ether bond, an ester bond, an alkoxy group, and an acetyl group.

4. The surface-treated infrared absorbing fine particle dispersion liquid according to claim 1, wherein the infrared absorbing fine particles are the infrared absorbing fine particles represented by a general formula WyOz (where W is tungsten, O is oxygen, satisfying 2.2≤z/y≤2.999), and/or a general formula MxWyOz (where M is one or more elements selected from H, He, alkali metal, alkaline earth metal, rare earth element, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Sc, Br, Te, Ti, Nb, V, Mo, Ta, Re, Hf, Os, Bi, I, and W is tungsten, O is oxygen, satisfying 0.001≤x/y≤1, 2.0≤z/y≤3.0).

5. The surface-treated infrared absorbing fine particle dispersion liquid according to claim 4, wherein the M is one or more elements selected from Cs, K, Rb, Tl, In and Ba.

6. The surface-treated infrared absorbing fine particle dispersion liquid according to claim 1, wherein the infrared absorbing fine particles are tungsten oxide fine particles and/or composite tungsten oxide fine particles, each having a hexagonal crystal structure.

7. The surface-treated infrared absorbing fine particle dispersion liquid according to claim 1, wherein the liquid medium is at least one selected from aromatic hydrocarbons, ketones, ethers, alcohols, and water, and the glass coating agent is a silane coupling agent.

8. The surface-treated infrared absorbing fine particle dispersion liquid according to claim 7, wherein the liquid medium is at least one selected from aromatic hydrocarbon, ketone, ether, and the glass coating agent is at least one selected from polysilazane and polyorganosilane.

9. The surface-treated infrared absorbing fine particle dispersion liquid according to claim 2, wherein the metal chelate compound or the metal cyclic oligomer compound contains Zn.

10. The surface-treated infrared absorbing fine particle dispersion liquid according to claim 5, wherein a crystallite size of the infrared absorbing fine particles is 10 nm or more and 70 nm or less.

11. An infrared absorbing transparent substrate having a coating layer on at least one surface of one or more transparent substrates, wherein the coating layer contains surface-treated infrared absorbing fine particles and a glass coating agent selected from the group consisting of silane coupling agents, polysilazane and polyorgonosilane, wherein such glass coating agent is liquid at room temperature, and the surface-treated infrared absorbing fine particles are infrared absorbing fine particles, each surface of which is coated with a coating layer containing at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound, wherein a thickness of the coating layer on each of the surface of the infrared absorbing fine particles is 0.5 nm or more and 2 nm or less.

12. The infrared absorbing transparent substrate according to claim 11, wherein the metal chelate compound or the metal cyclic oligomer compound contains at least one metal element selected from Al, Zr, Ti, Si, Zn.

13. The infrared absorbing transparent substrate according to claim 11, wherein the metal chelate compound or the metal cyclic oligomer compound has at least one type selected from an ether bond, an ester bond, an alkoxy group, and an acetyl group.

14. The infrared absorbing transparent substrate according to claim 11, wherein the infrared absorbing fine particles are the infrared absorbing fine particles represented by a general formula WyOz (where W is tungsten, O is oxygen, satisfying 2.2≤z/y≤2.999), and/or a general formula MxWyOz (where M is one or more elements selected from H, He, alkali metal, alkaline earth metal, rare earth element, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Hf, Os, Bi, I, Yb, W is tungsten, O is oxygen, satisfying 0.001≤x/y≤1, 2.0≤z/y≤3.0).

15. The infrared absorbing transparent substrate according to claim 14, wherein the M is one or more element selected from Cs, K, Rb, Tl, In and Ba.

16. The infrared absorbing transparent substrate according to claim 11, wherein the infrared absorbing fine particles are tungsten oxide fine particles and/or composite tungsten oxide fine particles, each having a hexagonal crystal structure.

17. The infrared absorbing transparent substrate according to claim 11, wherein the transparent substrate is at least one selected from a transparent glass substrate and a transparent resin substrate.

* * * * *